(12) United States Patent
Lombardo et al.

(10) Patent No.: US 8,336,233 B1
(45) Date of Patent: Dec. 25, 2012

(54) WEAR PLATE ASSEMBLY

(76) Inventors: Gaetano Lombardo, Phoenix, AZ (US);
Pasquale Lombardo, Phoenix, AZ (US)

( * ) Notice: Subject to any disclaimer, the term of this patent is extended or adjusted under 35 U.S.C. 154(b) by 0 days.

(21) Appl. No.: 13/441,810

(22) Filed: Apr. 6, 2012

(51) Int. Cl.
*E02F 9/28* (2006.01)
(52) U.S. Cl. ............. 37/453; 37/456; 172/719; 172/772
(58) Field of Classification Search .................... 37/451, 37/453, 455, 456, 457, 458; 172/719, 772
See application file for complete search history.

(56) References Cited

U.S. PATENT DOCUMENTS

| | | | | |
|---|---|---|---|---|
| 2,064,059 | A * | 12/1936 | Fellmeth | 37/456 |
| 4,086,712 | A | 5/1978 | McReynolds | |
| 4,128,132 | A | 12/1978 | Moen et al. | |
| 4,129,952 | A | 12/1978 | Olson | |
| 4,315,375 | A | 2/1982 | Shinn | |
| 4,716,666 | A | 1/1988 | Potter | |
| RE33,454 | E | 11/1990 | Potter | |
| 5,005,304 | A | 4/1991 | Briscoe et al. | |
| 5,055,336 | A | 10/1991 | Davis | |
| 5,056,243 | A | 10/1991 | Sprunger et al. | |
| 5,063,695 | A | 11/1991 | Briscoe et al. | |
| 5,088,214 | A | 2/1992 | Jones | |
| 5,129,168 | A | 7/1992 | Hedley | |
| 5,203,513 | A | 4/1993 | Keller et al. | |
| 5,241,765 | A | 9/1993 | Jones et al. | |
| 5,412,885 | A * | 5/1995 | Cornelius | 37/451 |
| 5,564,508 | A * | 10/1996 | Renski | 172/772 |
| 5,634,285 | A | 6/1997 | Renski | |
| 5,666,748 | A | 9/1997 | Emrich et al. | |
| 5,718,070 | A * | 2/1998 | Ruvang | 37/459 |
| 5,791,809 | A * | 8/1998 | Bessey | 403/348 |
| 5,913,605 | A | 6/1999 | Jusselin et al. | |
| 5,937,549 | A | 8/1999 | Bender et al. | |
| 5,992,063 | A * | 11/1999 | Mack | 37/450 |
| 6,030,143 | A | 2/2000 | Kreitzberg | |
| 6,041,529 | A | 3/2000 | Ruvang | |
| 6,085,448 | A * | 7/2000 | Gale et al. | 37/458 |
| 6,194,080 | B1 | 2/2001 | Stickling | |
| 6,826,855 | B2 * | 12/2004 | Ruvang | 37/450 |
| 7,144,183 | B2 | 12/2006 | Lian et al. | |
| 7,178,274 | B2 * | 2/2007 | Emrich | 37/453 |
| 7,367,144 | B2 | 5/2008 | Jones et al. | |
| 7,640,685 | B2 * | 1/2010 | Emrich | 37/457 |
| 7,712,234 | B2 | 5/2010 | Striegel | |
| 2004/0098886 | A1 * | 5/2004 | Hohmann et al. | 37/451 |
| 2007/0044349 | A1 | 3/2007 | McClanahan et al. | |
| 2009/0165339 | A1 * | 7/2009 | Watanabe | 37/454 |
| 2009/0205227 | A1 * | 8/2009 | Stewart et al. | 37/453 |

* cited by examiner

*Primary Examiner* — Jamie L McGowan
(74) *Attorney, Agent, or Firm* — Thomas W. Galvani, P.C.; Thomas W. Galvani

(57) ABSTRACT

A wear plate assembly includes a base, a wear plate, and a key. The wear plate is moveable with respect to the base between free and applied conditions. In the applied condition of the wear plate, the base and the wear plate cooperate to form a keyway for receiving the key. The keyway is located below the top of the base. The key is moveable between a first position corresponding to an unlocked configuration of the wear plate assembly and second position corresponding to a locked configuration of the wear plate assembly.

15 Claims, 15 Drawing Sheets

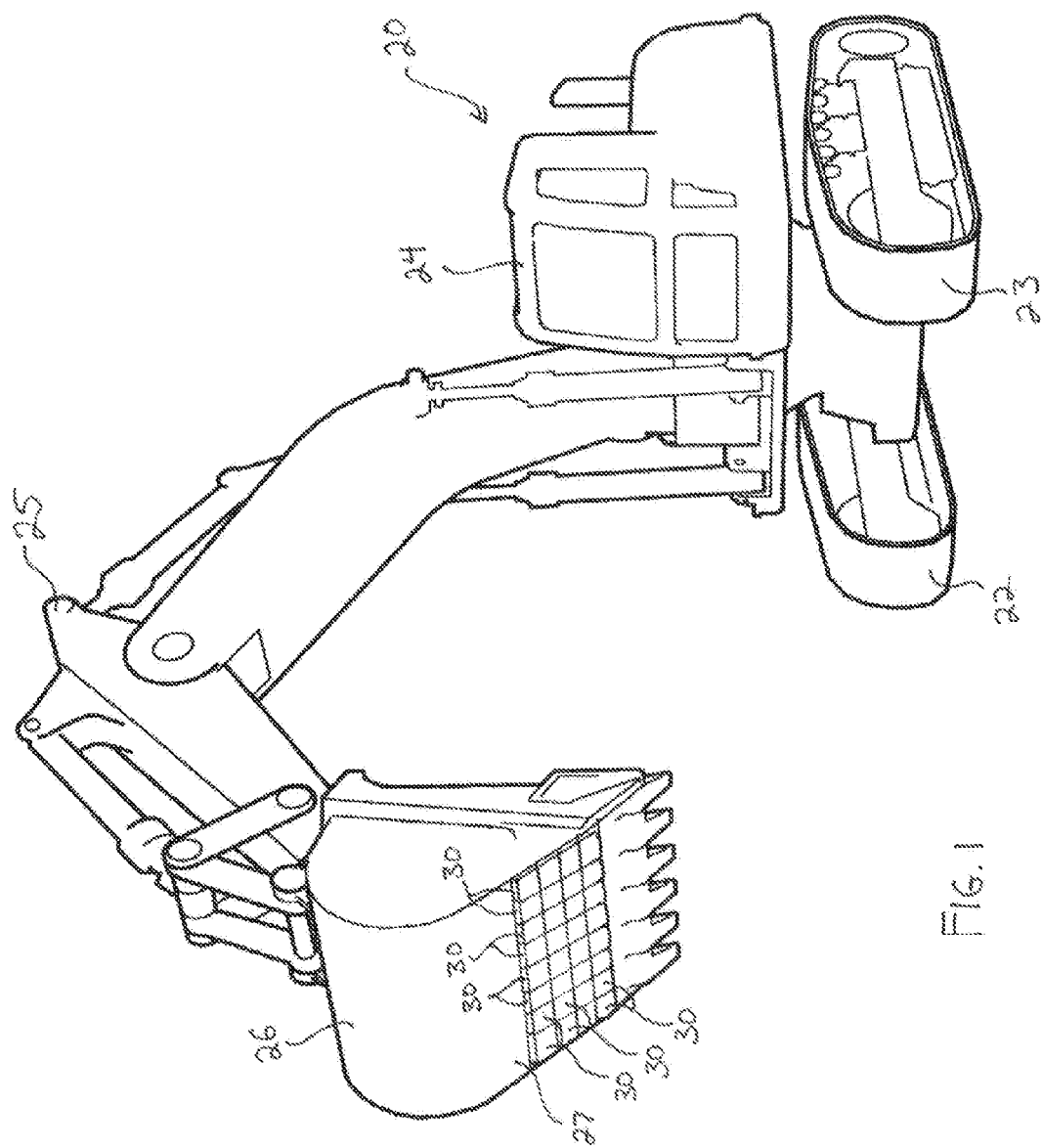

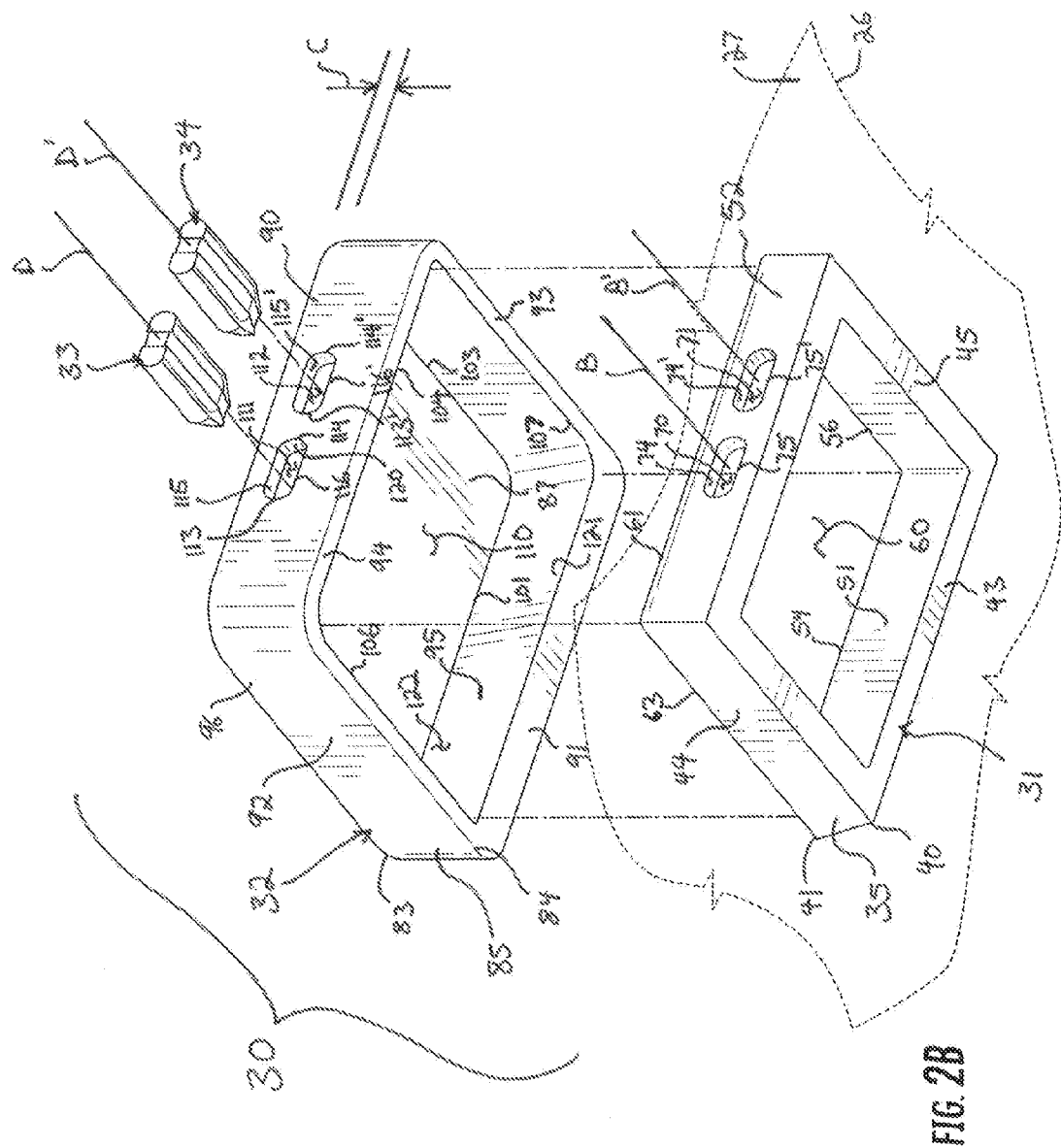

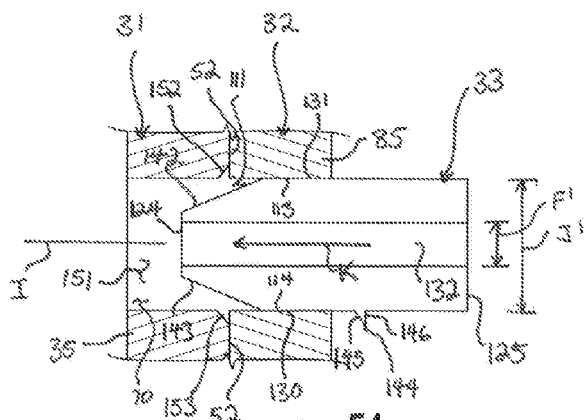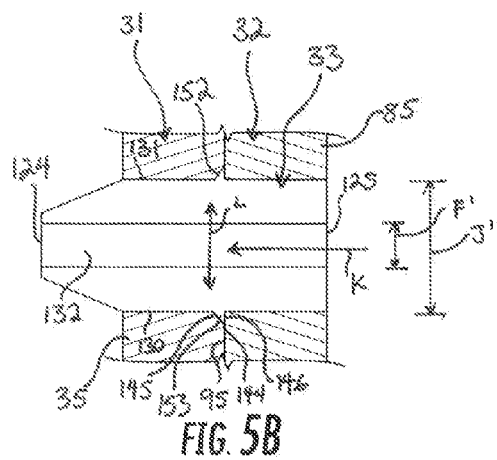
FIG. 5A    FIG. 5B
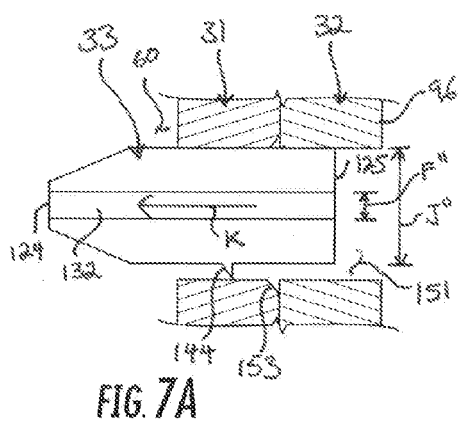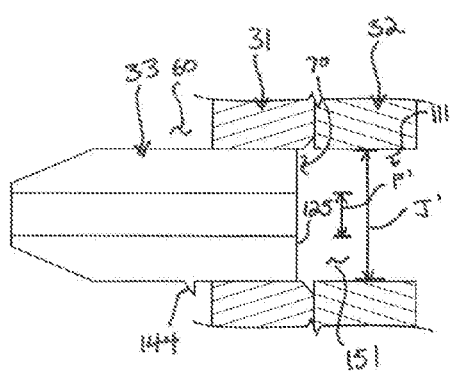
FIG. 7A    FIG. 7B

WEAR PLATE ASSEMBLY

FIELD OF THE INVENTION

The present invention relates generally to heavy machinery equipment, and more particularly to wear plates for preventing abrasion of heavy machinery parts.

BACKGROUND OF THE INVENTION

Heavy machinery equipment are used in excavation, demolition, construction, and similar activities. The parts of heavy machines used for digging are exposed to a great amount of wear in operation. For instance, the bucket of an excavator can be used to dig, rip, crush, cut, or lift dirt, rock, concrete, metal, or other rugged materials, which constantly wear against and abrade the surface of the excavator's bucket.

Heavy machinery parts are expensive and time-consuming to repair or replace. To replace a worn bucket on an excavator, for example, a new bucket must be ordered and shipped, the excavator must be taken out of operation, the old bucket must be removed, and the new one must be installed. This requires significant time and effort. Various attempts have been made to protect heavy machinery parts to avoid having to replace the entire part. For instance, there are abrasive wear elements that can be secured to the surface of an excavator bucket to protect that surface. However, many of these elements are welded or bolted on to the surface of the machinery part and can be difficult to replace once worn through. In wear elements which have bases and attachable wear plates, when the abrasive wear plate is worn, the engagement means securing the base to the surface is often also damaged, which requires that the entire base be ground or cut off and replaced.

SUMMARY OF THE INVENTION

In accordance with the principle of the invention, a wear plate assembly for protecting the surface of heavy machinery includes a base with a bottom, a top, an upper surface of the top, a sidewall sidewall extending from the bottom to the top along a perimeter edge of the base, opposed inner and outer surfaces of the sidewall, an interior bound by the inner surface of the sidewall, and a first minor keyway extending through the base. A wear plate includes a top, an opposed bottom, an outer sidewall extending from the top to the bottom, opposed inner and outer surfaces of the outer sidewall, an interior bound by the inner surface of the outer sidewall and the top, and a second minor keyway extending through the wear plate. The wear plate is moveable between a free condition and an applied condition applied to the base. In the applied condition of the wear plate, the top of the wear plate is received against the top of the base, the inner surface of the outer sidewall of the wear plate is in contact with the outer surface of the sidewall of the base, and the second minor keyway is registered with respect to the first minor keyway, forming a major keyway communicating with the interiors of the wear plate and the base. A key is moveable with respect to the major keyway between a first position corresponding to an unlocked configuration of the wear plate and a second position corresponding to a locked configuration of the wear plate preventing relative movement of the base and the wear plate. The first minor keyway is located below the top of the base, and the first and second minor keyways are formed through the sidewalls of the base and the wear plate, respectively. The keyway is located at position generally intermediate between the top and bottom of the base. In the second position of the key, the key is compressed within the major keyway so that the key exerts an outward bias on the sidewalls of the base and the wear plate. The key has a front end, an opposed rear end, opposed first and second sides, and a projection carried on the first side between the opposed front and rear ends. The key is biased from a compressed condition in which the sides of the key are toward each other to a relaxed condition in which the sides of the key are away from each other. The major keyway includes a notch for receiving the projection of the key in the second position of the key. In the second position of the key corresponding to the locked configuration, the sides of the key are in contact with the major keyway, the projection is received in the notch, and the key is in the compressed condition. The key includes a compressible middle formed between the opposed sides of the key, and the opposed sides of the key are rigid.

In accordance with the principle of the invention, a wear plate assembly for protecting the surface of heavy machinery includes a base having a bottom, an opposed top, an upper surface of the top, a sidewall extending from the bottom to the top along a perimeter edge of the base, opposed inner and outer surfaces of the sidewall, an interior bound by the inner surface of the sidewall, and a brace extending through the interior of the base between opposed sides of the sidewall. A includes a top, an opposed bottom, an outer sidewall extending from the top to the bottom, opposed inner and outer surfaces of the outer sidewall, an interior bound by the inner surface of the outer sidewall and the top, and a hold extending from the top of the wear plate into the interior of the wear plate for receiving a key. The wear plate is moveable between a free condition and an applied condition applied to the base. In the applied condition of the wear plate, the top of the wear plate is received against the top of the base, the inner surface of the outer sidewall of the wear plate is in contact with the outer surface of the sidewall of the base, and the hold extends into the interior of the base proximate to the brace. A key is applied to the hold for movement between a first position corresponding to an unlocked configuration of the wear plate and a second position corresponding to a locked configuration of the wear plate preventing relative movement of the base and the wear plate. The key is located below the top of the base. The brace is formed with a void through the brace in a first direction, and the hold is formed with a slot through the hold in a second direction parallel to the first direction. In the second position of the wear plate, the void and slot cooperate to form a keyway, and in the second position of the key, the key extends through the keyway. The keyway is located at a position generally intermediate between the top and bottom of the base. The hold includes an elongate seat recessed below the top of the wear plate which extends along a first axis, opposed walls extending from the top of the wear plate to the seat on opposed sides of the first axis, and slots formed in the opposed walls of the hold proximate to the seat. A vertical bore extends through the seat. The key has a cylindrical key body and opposed projections extending radially outward from the key body along a second axis. In the first position of the key in the hold, the key is received within the bore, the second axis of the key is aligned with the first axis of the hold, and the opposed projections are within the receiving space, and in the second position of the key in the hold, the key is received within the bore, the second axis of the key is transverse to the first axis of the hold, and the opposed projections extend through the slots in the walls of the hold in interfering contact between the base and the wear plate. There are means for biasing the key into a friction fit between the base and the wear plate, and the means are carried by one of the base, the wear plate, and the key. In some embodiments, the means for biasing the key include an elastomeric gasket carried by the key.

BRIEF DESCRIPTION OF THE DRAWINGS

Referring to the drawings:

FIG. 1 is a perspective view of a wear plate assembly according to the principle of the invention as it would appear secured to a surface of a heavy equipment machine;

FIG. 2B is an exploded bottom perspective view of the base, the wear plate, and the keys of the wear plate assembly, and the surface of the heavy equipment machine of FIG. 2A;

FIGS. 5A and 5B are section views taken along the line 5-5 of FIG. 4C showing the steps of application of the key to a keyway formed by the base and the wear plate;

FIGS. 7A and 7B are section views taken along the line 7-7 of FIG. 6A showing the steps of removal of the key from the keyway formed in the base and the wear plate;

DETAILED DESCRIPTION

Figure 2A:
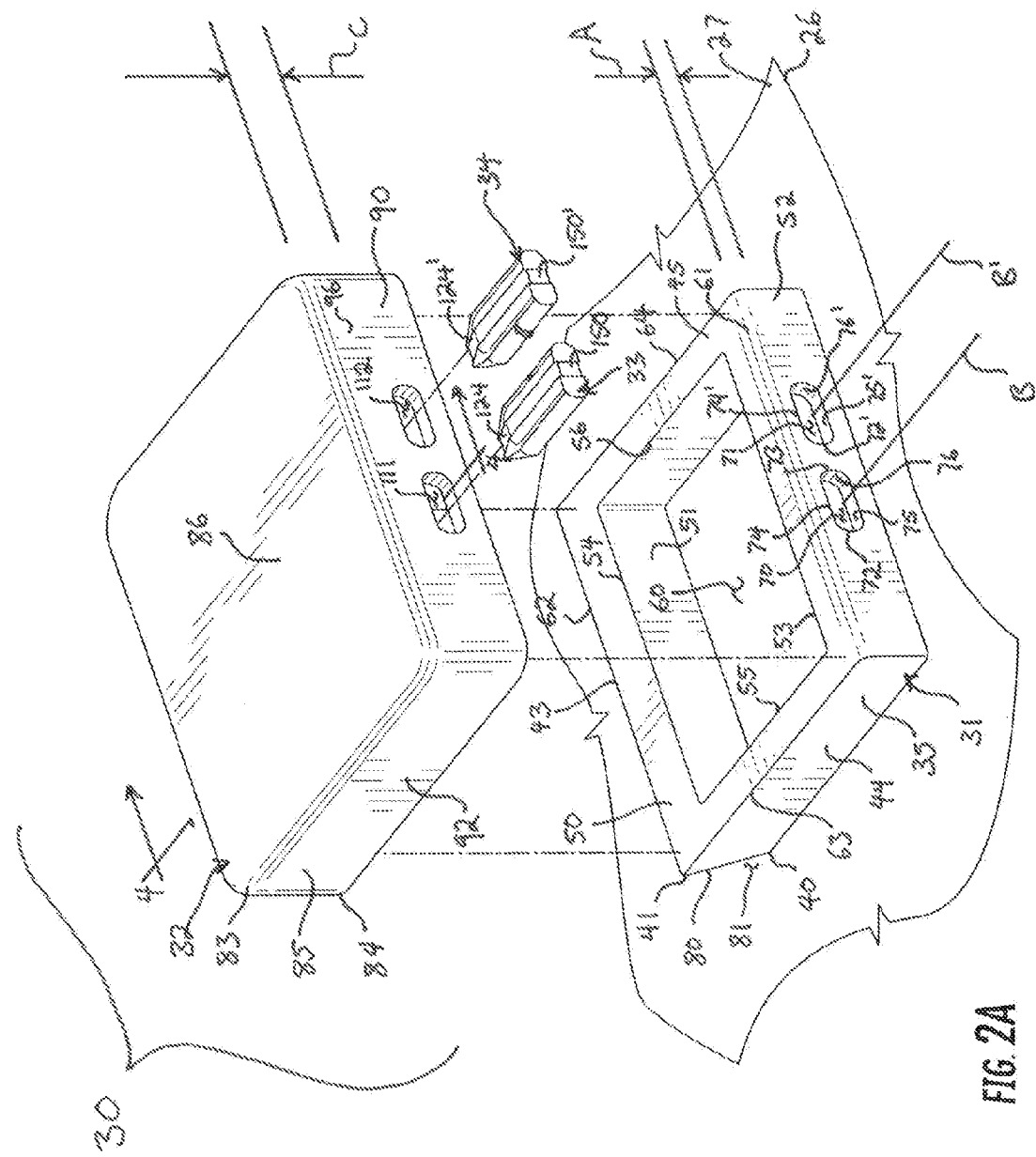
FIG. 2A is an exploded top perspective view of a base, a wear plate, and keys of an embodiment of the wear plate assembly, and the surface of the heavy equipment machine of FIG. 1.

Reference now is made to the drawings, in which the same reference numbers are used throughout the different figures to designate the same components. FIG. 1 shows an excavator 20 typical of heavy machinery used for digging, ripping, crushing, cutting, lifting, or various other construction and demolition practices. The excavator 20 includes a chassis 21, two belted tracks 22 and 23 mounted to the chassis 21, an operator's cab 24, a pneumatic boom and arm assembly 25, and a bucket 26 disposed at the end of the boom and arm assembly 25. The bucket 26 has an outer surface 27 and is constructed from a strong, rigid, rugged material or combination of materials such as steel, iron, or the like. Wear plate assemblies 30 are mounted across the outer surface 27 of the bucket 26 to protect the outer surface from abrasion as the bucket 26 is ripped through the ground. The wear plate assemblies 30 are arranged in a dense array across the outer surface 27, with each wear plate assembly 30 mounted close to the neighboring wear plate assembly 30 so that the gap between two neighboring wear plate assemblies 30 is slight.

One of the wear plate assemblies 30 according to the principle of the invention is shown on the outer surface 27 in detail in exploded view in FIGS. 2A and 2B. As seen in FIG. 2A, wear plate assembly 30 includes a base 31, a wear plate 32, and two keys 33 and 34. The base 31 is a bracket with an annular, upstanding sidewall 35 extending from a bottom 40 to an opposed top 41. The sidewall 35 is composed of four sides or portions, which are designated here for reference only as a front portion 42, a rear portion 43, a left portion 44, and a right portion 45. Each of the four portions 42, 43, 44, and 45 has a generally rectangular cross-section. The base 31 has a top surface 50 located at the top 41 and has opposed inner and outer surfaces 51 and 52. The outer surface 52 is slightly oblique along the front, left, and right portions 42, 44, and 45. The top surface 50 and the inner surface 51 meet at right angles and form four inner edges 53, 54, 55, and 56 at the front portion 42, rear portion 43, left portion 44, and right portion 45, respectively. The inner surface 51 bounds an interior 60 within base 31 between the outer surface 27 of the bucket 26 and the top 41 of the base 31. The top surface 50 and the outer surface 52 meet at and form four outer edges 61, 62, 63, and 64 at the front portion 42, rear portion 43, left portion 44, and right portion 45, respectively. The outer edge 61 is preferably beveled.

The front portion 42 is formed with two discontinuous, spaced-apart slots 70 and 71 extending through the front portion 42 from the inner surface 51 to the outer surface 52. The slots 70 and 71 are identical in every respect other than location, and as such only the slot 70 will be described, with the understanding that the ensuing discussion applies equally to the slot 71 and that reference characters used to describe the various structural features of the slot 70 are applied to the slot 71 but designated with a prime ("'") so as to distinguish those structural features from the features of the slot 70. The slot 70 is elongate between opposed ends 72 and 73 and has a top 74 and a bottom 75 which extend between the opposed ends 72 and 73. The top 74 of the slot 70 is spaced below the top surface 50 of the base 31 by a distance A, as shown in FIG. 2A. The slot 70 extends lengthwise between the opposed ends 72 and 73 in the front portion 42 at a location generally intermediate to the bottom 40 and top 41 of the base 31, and generally intermediate in the front portion 42 between the left and right portions 44 and 45. The slot 70 is bound by an inner sidewall 76 which extends through the front portion 42 from the inner surface 51 to the outer surface 52. The inner sidewall 76 is arcuate at the opposed ends 72 and 73, and is generally linear between the opposed ends 72 and 73, so that the top 74 and bottom 75 are parallel. The slot 70 and the inner sidewall 76 are geometrically centered with respect to an axis extending through the slot 70 and denoted with the reference character B in FIG. 2A. The inner sidewall 76, and axis B, are longitudinal with respect to the left and right portions 44 and 45, and are transverse with respect to the front and rear portions 42 and 43. Axis B is parallel with respect to the outer surface 27 of the bucket 26 and to the top surface 50 of the base 31. As mentioned above, the slot 71 is identical in structure to the slot 70, and as such includes opposed ends 72' and 73', a top 74', a bottom 75', an inner sidewall 76', and a geometric axis B'. The slot 71 extends lengthwise between the opposed ends 72 and 73 in the front portion 42 at a location generally intermediate to the bottom 40 and top 41 of the base 31, and generally intermediate in the front portion 42 between the left and right portions 44 and 45.

With continuing reference to FIG. 2A, the rear portion 43 of the base 31 is formed with an overhanging lip 80 that extends diagonally outward from the bottom 40 to the top 41 of the rear portion 43. The rear portion 43 is thicker in cross-section proximate to the top 41 of the base 31 than proximate to the bottom 40 of the base 30. The lip 80 extends across the rear portion 43 of the base 30 and defines a concave receiving area 81 between the lip 80 and outer surface 27 of the bucket 26, which can be more easily seen in the section view of FIG. 4A. The lip 80 is aligned at an acute angle with respect to the outer surface 27, forming an inner corner 82 between the lip 80 and the outer surface 27.

The base 31 is constructed of a material having characteristics of ruggedness, durability, rigidity, hardness, such as iron or steel, and is preferably integrally formed or cast. The base 31 is permanently secured to the outer surface 27 of the bucket 26 along the bottom 40 of the base 31, such as by welding or other similar rugged fastening, so as to provide a rugged, stable, and strong support for the wear plate 32.

The wear plate 32 is a protective piece that protects the base 31 and the outer surface 27 of the bucket 26 from abrasion. With continuing reference to FIG. 2A in which the wear plate 32 is illustrated from above, the wear plate 32 has a top 83, an opposed bottom 84, and a sidewall 85 depending from the top 83 to the opposed bottom 84 around a perimeter of the wear plate 32. The top 83 has an upper surface 86 and opposed lower, or inner, surface 87, as seen in FIG. 2B. The upper and inner surfaces 86 and 87 are generally flat and parallel with respect to each other. The sidewall 85 is composed of four sides or portions which are designated here for reference only as a front portion 90, a rear portion 91, a left portion 92, and a right portion 93. Each of the four portions 90, 91, 92, and 93 has a generally rectangular cross-section, extends perpendicularly to the neighboring portions, and depends perpendicularly from the top 83. The sidewall 85 has a bottom surface 94, and opposed inner and outer surfaces 95 and 96. The inner surface 95 is slightly oblique along the front, left, and right portions 90, 92, and 93. The inner surface 95 of the sidewall 85 and the inner surface 87 of the top 83 meet at right angles and form four inner edges 100 (not shown), 101, 102 (not shown), and 103 at the front potion 90, the rear portion 91, the left portion 92, and the right portion 93, respectively. The bottom and inner surfaces 94 and 95 of the sidewall 85 meet at right angles and form lower edges 104, 105, 106, and 107 at the front portion 90, the rear portion 91, the left portion 92, and the right portion 93, respectively. With continuing reference to FIG. 2B, the inner surface 95 of the sidewall 85 bounds an interior 110 within the wear plate 32 between the inner surface 87 of the top 83 and the bottom surface 94 of the sidewall 85.

Still referring to FIG. 2B, the front portion 90 of the wear plate 32 is formed with two discontinuous, spaced-apart slots 111 and 112 extending through the front portion 90 from the inner surface 95 to the outer surface 96. The slots 111 and 112 are identical in every respect other than location, and as such only the slot 111 will be described, with the understanding that the ensuing discussion applies equally to the slot 112 and that reference characters used to describe the various structural features of the slot 111 are applied to the slot 112 but designated with a prime ("'") so as to distinguish those structural features from the features of the slot 111. The slot 111 is elongate between opposed ends 113 and 114 and has a top 115 and a bottom 116 which extend between the opposed ends 113 and 114. The top 115 of the slot 111 is spaced below the upper surface 86 of the wear plate 32 by a distance C, as shown in FIGS. 2A and 2B. The slot 111 extends lengthwise between the opposed ends 113 and 114 in front portion 90 at a location generally intermediate to the top 83 and bottom 84 of the wear plate 32, and generally intermediate in the front portion 90 between the left and right portions 92 and 93. The slot 111 is bound by an inner sidewall 120 which extends through the front portion 90 from the inner surface 95 to the outer surface 96. The inner sidewall 120 is arcuate at the opposed ends 113 and 114, and is generally linear between the opposed ends 113 and 114, so that the top 115 and bottom 116 are parallel. The slot 111 and inner sidewall 120 are geometrically centered with respect to an axis extending through the slot 111 and denoted with the reference character D in FIG. 2B. The inner sidewall 120, and axis D, are longitudinal with respect to the left and right portions 92 and 93, and are transverse with respect to the front and rear portions 90 and 91. Axis D is parallel with respect to axis B and to the upper, inner, and bottom surfaces 86, 87, and 94 of the wear plate 32. As mentioned above, the slot 112 is identical in structure to the slot 111, and as such includes opposed ends 113' and 114', a top 115', a bottom 116', an inner sidewall 120', and a geometric axis D'. The slot 112 extends lengthwise between the opposed ends 113 and 114 in the front portion 90 at a location generally intermediate to the top 83 and bottom 84 of the wear plate 32, and generally intermediate in the front portion 90 between the left and right portions 92 and 93.

Figure 4A:
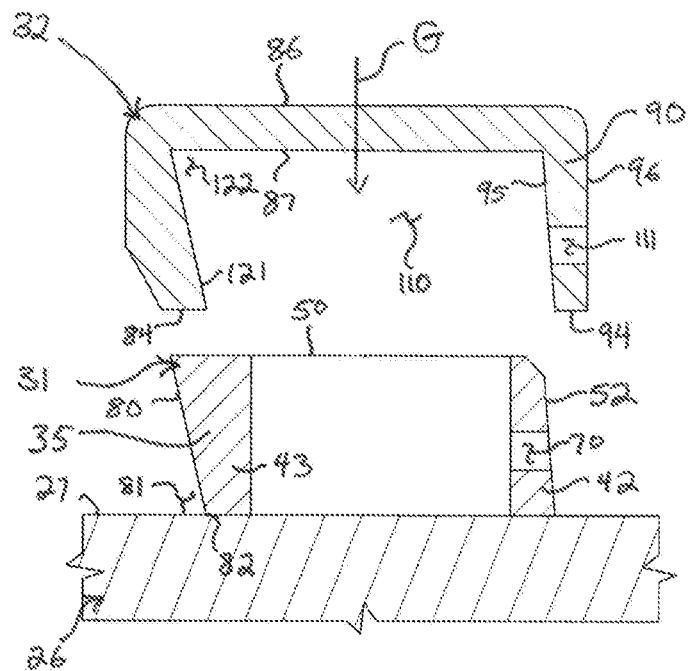
FIGS. 4A-4D are section views taken along the line 4-4 of FIG. 2A showing a sequence of steps of application of the wear plate to the base secured to the surface of the heavy equipment machine.

With continuing reference to FIG. 2B, the rear portion 91 of the wear plate 32 is formed with a projecting lip 121 that extends diagonally inward from proximate to the top 83 of the wear plate 32 to the bottom 84 of the wear plate 32. The rear portion 91 is thicker in cross-section proximate to the bottom 84 of the wear plate 32 than proximate to the top 83 of the wear plate 32. The lip 121 extends across the rear portion 91 of the wear plate 32 and defines a concave receiving area 122 between the lip 121 and the inner surface 87 of the top 83, which can be more easily seen in the section view of FIG. 4A. The lip 121 is aligned at an acute angle with respect to the inner surface 87 at the inner edge 101. With continuing reference to FIG. 4A, the rear portion 91 of the wear plate 32 is beveled along the bottom 84 of the sidewall 85 forming a steep bevel 123 in the sidewall 85.

The wear plate 32 is constructed of a material having characteristics of ruggedness, durability, rigidity, hardness, such as iron or steel, and is preferably integrally formed or cast. The top 83 is roughly six inches long on each side and the base is roughly two inches high between the top 83 and the bottom 84.

Figure 3A:
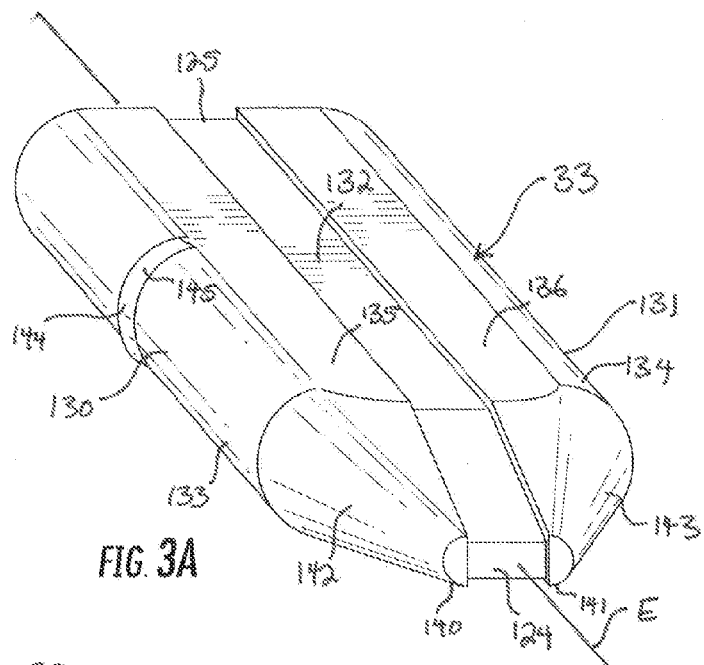
FIG. 3A is a perspective view of one of the keys of FIG. 2A.
Figure 3B:
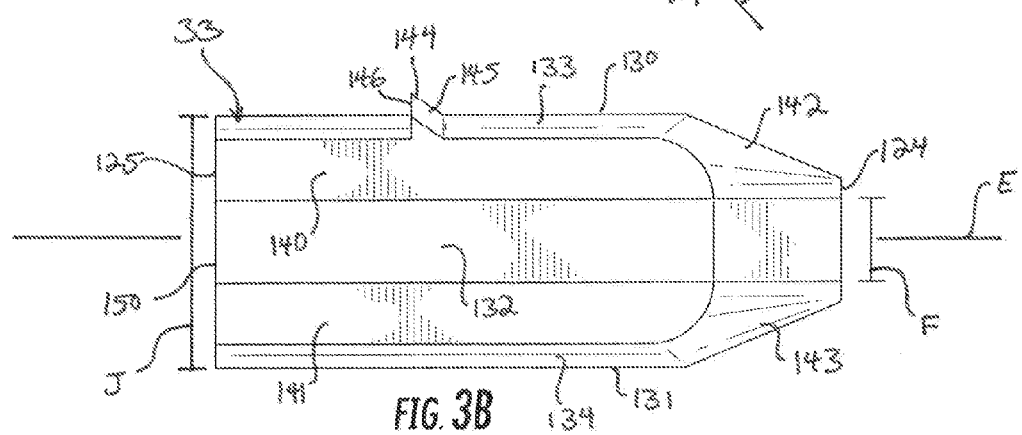
FIGS. 3B and 3C are bottom plan views of the key of FIG. 3A in a relaxed and compressed condition, respectively.
Figure 3C:
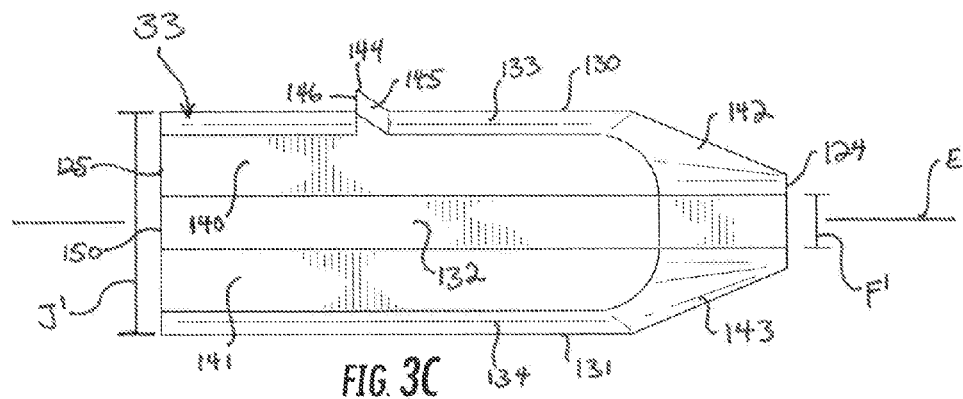

Attention is now directed to the keys 33 and 34, which are identical in every respect. FIGS. 3A, 3B, and 3C illustrate the key 33 in detail, and the description herein will refer only to the key 33 with the understanding that the discussion applies equally to the key 34 and that reference characters used to describe the various structural features of the key 33 are applied to the key 34 but designated with a prime ("'") so as to distinguish those structural features from the features of the key 33. The key 33 includes opposed front and rear ends 124 and 125 oriented along a longitudinal axis E, as indicated in FIG. 3A, opposed first and second sides 130 and 131 extending between the front and rear ends 124 and 125, and a compressible middle 132 between the first and second sides 130 and 131. The first and second sides 130 and 131 are generally semi-cylindrical, and have arcuate outer surfaces 133 and 134, respectively, and generally flat tops 135 and 136 and bottoms 140 and 141, respectively. First and second sides 130 and 131 have semi-conical tips 142 and 143 which taper in diameter from the semi-cylindrical sides 130 and 131 toward the front end 124.

The key 33 carries a catch or projection 144 on the first side 130 at a location generally intermediate with respect to the front and rear ends 124 and 125 of the key 33. The projection 144 is a quasi-annular ridge formed along the outer surface of the first side 130 between the top 135 and the bottom 140. As best seen in FIG. 3B, the projection 144 has an inclined front surface 145 directed toward the front end 124, and a rear surface 146 directed toward the rear end 125 that is parallel to the rear end 125.

The middle 132 extends between the opposed sides 130 and 131 from the front end 124 to the rear end 125. The middle 132 is compressible and, as shown in FIG. 3B, has a width in a relaxed state denoted with the reference character F, and, as shown in FIG. 3C, in a compressed state and denoted with the reference character F', wherein the relaxed width F is greater than the compressed width F'. When the middle 132 is in a relaxed state, the key has a width J, and when the middle is in a compressed state, the key has a width J' which is less than the relaxed width J. The middle 132 may be super compressed as will later be described, wherein the middle 132 has a width F'' and the key 33 has a width J''. The middle 132 at the rear end 125 of the key 33 is flush with the first and second sides 130 and 131, forming a continuously flat back 150 at the rear end 125. Along the tops 135 and 136, the bottoms 140 and 141, and the tips 142 and 143, the middle 132 is receded slightly from the first and second sides 130 and 131.

The opposed sides 130 and 131 of the key 33 are constructed from a material or combination of materials having characteristics of ruggedness, durability, rigidity, and hardness, such as iron or steel, and are preferably integrally formed or cast. The middle 132 of the key 33 is preferably constructed from an elastic material having material characteristics of elasticity, compressibility, cyclic durability, and shape memory, such as urethane or butyl rubber.

As mentioned above, the key 34 is identical in structure to the key 343, and as such includes opposed front and rear ends 124' and 125', axis E', opposed first and second sides 130' and 131', a middle 132', outer surfaces 133' and 134', tops 135' and 136' and opposed bottoms 140' and 141', tips 142' and 143', a projection 144', opposed front and rear surfaces 145' and 146', and a back 150'. Likewise, the key 34 is constructed of similar materials as in the key 33.

Assembly of the wear plate assembly 30 according to the principle of the invention will now be discussed with reference to FIGS. 4A-4D, which are section views. With reference first to FIG. 4A, the base 31 is illustrated as it would be secured to the outer surface 27 of the bucket by a weld along the bottom 40 of the base 31. The wear plate 32 is initially in a free condition away from and above the base 31, ready to be applied to the base 31. The wear plate 32 is registered with the base 31, with the top 83 of the wear plate 32 directed away from the bucket 26 and the bottom 84 of the wear plate 32 directed downwardly toward the bucket 26, the front portion 90 of the wear plate 32 above the front portion 42 of the base 31, the rear portion 91 of the wear plate 32 above the rear portion 43 of the base 31, and, though not shown in FIG. 4A, the left and right portions 92 and 93 of the wear plate 32 above the left and right portions 44 and 45 of the base 31, respectively. In this initial registered position, the inner surface 95 of the sidewall 85 of the wear plate 32 is aligned above the outer surface 52 of the sidewall 35 of the base 31. The wear plate 32 is then moved downward generally along the direction indicated by line G in FIG. 4A to move the wear plate 32 into the partially-applied position illustrated in FIG. 4B.

Figure 4B:
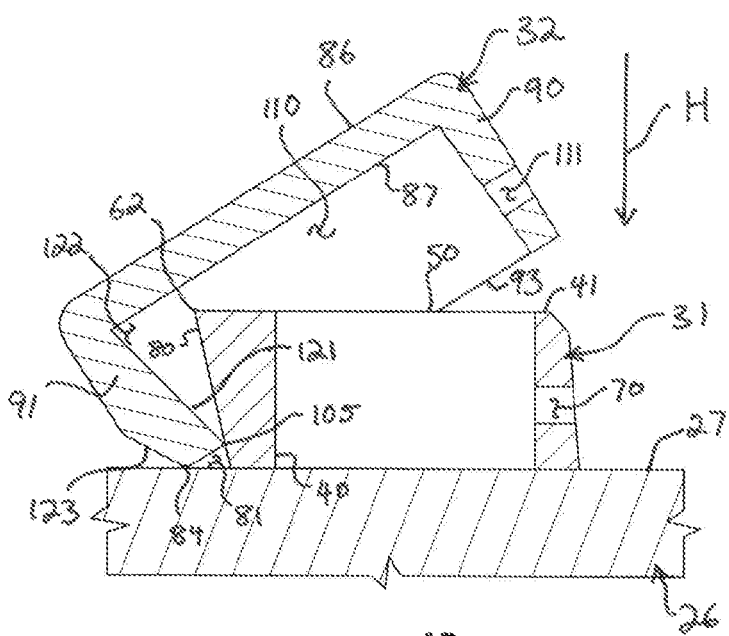
Figure 4C:
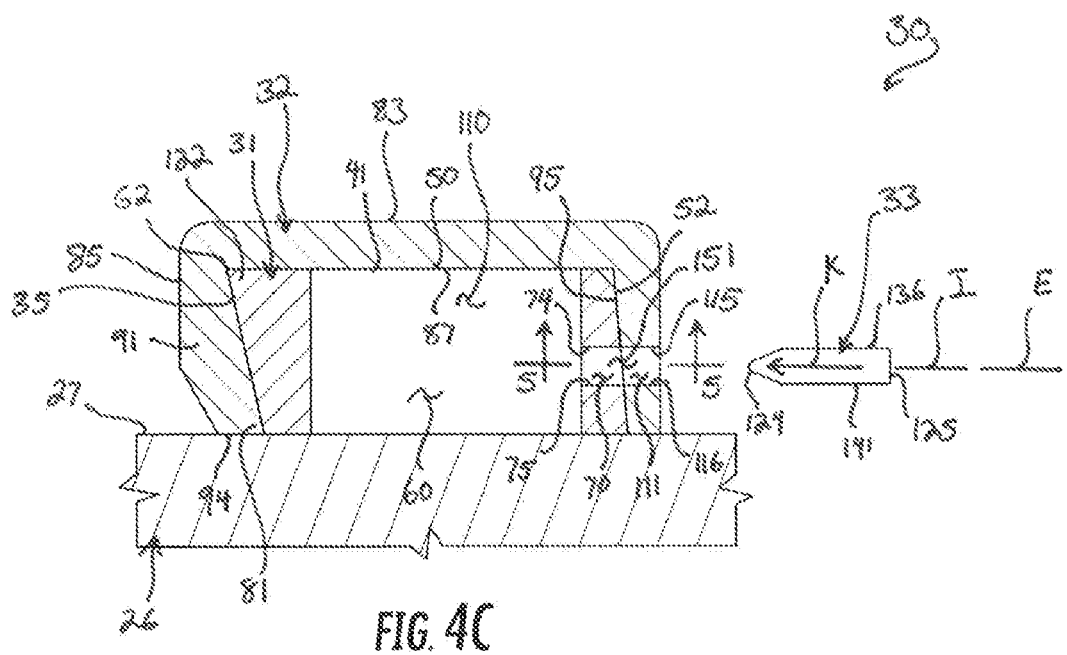

FIG. 4B illustrates the wear plate 32 partially applied to the base 31. The wear plate 32 is tilted over the base 31, with the rear portion 91 of the wear plate 32 proximate to the bottom 40 of the base 31 and the front portion 90 of the wear plate 32 above the top 41 of the base 31. The bevel 123 in the sidewall 85 allows the wear plate 32 to tilt while proximate to the base 31, providing room for the wear plate 32 to tilt. The rear portion 91 of the sidewall 85 is within the receiving area 81 formed between the lip 80 and the outer surface 27 of the bucket 26. The outer edge 62 of the rear portion 91 of the wear plate 32 is within the receiving area 122 formed between the lip 121 and the inner surface 87 of the top 83 of the wear plate 32. In this arrangement, the wear plate 32 partially encircles the base 31, and, although it cannot be seen in this view, the left and right portions 92 and 93 of the wear plate 32 surround the left and right portions 44 and 45 of the base 31. The wear plate 32 is further moved downward generally along the direction indicated by line H in FIG. 4B, base 31 into the interior 110 of the wear plate 32 as illustrated in FIG. 4C. The beveled outer edge 61 allows the wear plate 32 to rotate and move downward the base 31 without catching. Although the above description of the application of the wear plate 32 to the base 31 has been described with a series of steps, it should be understood that the wear plate 32 is applied in one single, fluid motion to the base 31 in approximately one second.

FIG. 4C illustrates the wear plate 32 applied to the base 31. In this applied condition, the sidewall 85 of the wear plate 32 is received in juxtaposition against the sidewall 35 of the base 31, the top surface 50 of the base 32 is in contact with the lower surface 87 of the wear plate 32, and the outer surface 52 of the base 31 is in contact with the inner surface 95 of the wear plate 32. The outer edge 62 of the base 31 projects into the receiving area 122, and the rear portion 91 of the wear plate 32 extends into the receiving area 81 of the base 31 in a lapping engagement so that the wear plate 32 is limited in direct vertical movement upward away from the base 31. The wear plate 32 is fully seated on the base 31 so that the bottom surface 94 of the wear plate 32 is in contact with the outer surface 27 of the bucket 26. In this applied condition, the wear plate 32 fully encapsulates the base 31, but for the slots 111 and 112. The top 41 of the base 31 is separated from the environment by the vertical thickness of the top 83 of the wear plate 32, and the sidewall 35 of the base 31 is separated from the environment by the lateral thickness of the sidewall 85 of the wear plate 32. Moreover, the interior 60 is separated from the environment by the vertical thickness of the tops 41 and 83 of the base 31 and wear plate 32, respectively, and by the lateral thickness of the sidewalls 35 and 85 of the base 31 and wear plate 32, respectively, but for the slots 70 and 111.

In the applied condition of the wear plate 32 as illustrated in FIG. 4C, the slots 70 and 111 are aligned. Slots 70 and 111 are each minor keyways, which, in the applied condition of the wear plate 32 to the base 31, cooperatively register to form a major keyway 151 extending through the sidewalls 35 and 85 of the base 31 and the wear plate 32, respectively, to the interior 110 of the wear plate 32 and the interior 60 of the base 31 along an axis denoted by the reference character I in FIG. 4C. The top 74 of the slot 70 is flush with the top 115 of the slot 111, the bottom 75 of the slot 70 is flush with the bottom 116 of the slot 111, and, although not viewable in FIG. 4C, the ends 72 and 113 are flush and the ends 73 and 114 are flush. The keyway 151 provides access to the interiors 60 and 110 from outside the wear plate 32. In this applied condition of the wear plate 32, the keyway 151 is formed to receive the key 33. In FIG. 4C, the key 33 is outside of the keyway 151 and the wear plate 32 is an unlocked configuration. Axis E of the key 33 is aligned with the axis I of the keyway 151 so that the front end 124 of the key 33 is directed toward the keyway 151, the rear end 125 is directed away from the keyway 151, the top 136 of the key 33 is registered with the tops 74 and 115 of slots 70 and 111 comprising the keyway 151, and the bottom 141 of the key 33 is registered with the bottoms 75 and 116 of the slots 70 and 111. The key 33 is thus in a ready position for insertion into the keyway 151.

Attention is now directed to FIGS. 5A and 5B, which are enlarged views of the keyway 151 and show the steps of applying the key 33 to the keyway 151 to configure the base 32 into a locked configuration. The key 33 is moved from the free condition of FIG. 4C to the partially-applied condition by taking up the key 33 by hand and forcing it into the keyway 151 along a direction of movement parallel to the axis I of the keyway 151 and indicated by the arrowed line K in FIG. 5A. The tapered front end 124 enters the slot 111 portion of the keyway 151 first. The slot 111 is a rigid, nondeformable mouth, and as such, obstructs the forward progress of the key 33. Forceful application of the key 33 to the keyway 151, however, for example by pressing on the rear end 125 with a crowbar or other tool, causes the key 33 to advance forward along the tapered front end 124. As the key 33 advances, it compresses at the compressible middle 132, which deforms from the relaxed state with width F to the compressed state with width F' once the tips 142 and 143 are fully within the keyway 151. In this state, shown in FIG. 5A, the key 33 has the compressed width J' and is held in the compressed state by the interaction between the ends 113 and 114 of the slot 111 portion of the keyway 151 in contact with the first and second sides 131 and 130 of the key 33, respectively.

The keyway 151 is formed with bevels on the outer surface 52 of the sidewall 52 of the base 31, which, when the wear plate 32 is in the applied condition thereof, cooperate with the wear plate 32 to form notches 152 and 153 between the base 31 and the wear plate 32 extending outwardly from the keyway 151. The key 33 continues to be forcibly advanced along the direction indicated by line K until the projection 144 reaches one of the notches 152 and 153. As shown in FIG. 5B, the projection 144 is received in the notch 153 and snaps into position within the notch 153, locking the key 33 in the keyway 151. Both notches 152 and 153 are sized and shaped to closely receive the projection 144 as a detent so as to hold the key 33 in place. Although the above description of the application of the key 33 to the keyway 151 has been described with a series of steps, it should be understood that the key 33 is preferably applied in one single, fluid motion to the keyway 151 in approximately one to three seconds.

In FIG. 5B, the key 33 constitutes a locking element between the base 31 and the wear plate 32. The compressed middle 132 of the key 33 biases the first and second sides 130 and 131 into the sidewalls 35 and 85 in a press-fit engagement within the keyway 151 which resists movement in and out of the keyway 151. Further, the rear surface 146 of the projection 144 abuts the inner surface 95 of the wear plate 32, preventing movement of the key 33 backward with respect to line K. Still further, forward movement of the key 33 along line K requires application of a force along line K sufficient to overcome the backward force caused by the outward bias of the compressible middle 132 pressing the inclined plane of the front surface 145 of the projection 144 against the notch 153. Use of a crowbar or leveraged tool to press the key 33 advances the key 33 out of the locked configuration shown in FIG. 5B. Relative lateral movement of the base 31 and the wear plate 32 along the directions indicated by the double-arrowed line L in FIG. 5B is prevented by the interaction of the key 33 in the keyway 151 with the sidewalls 35 and 85 of the base 31 and wear plate 32, respectively. Movement of one of the base 31 and the wear plate 32 in a direction along L produces an equal force from the key 33 to the other of the base 31 and the wear plate 32, and thus produces an equal and opposite resultant force biasing the one of the base 31 and the wear plate 32 back. Likewise, relative vertical movement of the base 31 and the wear plate 32 in and out of the page in FIG. 5B is prevented by the interaction of the key 33 in the keyway 151 with the sidewalls 35 and 85 of the base 31 and wear plate 32, respectively. Movement of one of the base 31 and the wear plate 32 in a direction in or out of the page produces an equal force from the key 33 to the other of the base 31 and the wear plate 32, and thus produces an equal and opposite resultant force biasing the one of the base 31 and the wear plate 32 back. In this way, the wear plate 32 is secured to the base 31 in a secure, strong, and resilient engaged and locked configuration, as shown in FIG. 4D.

Figure 4D:
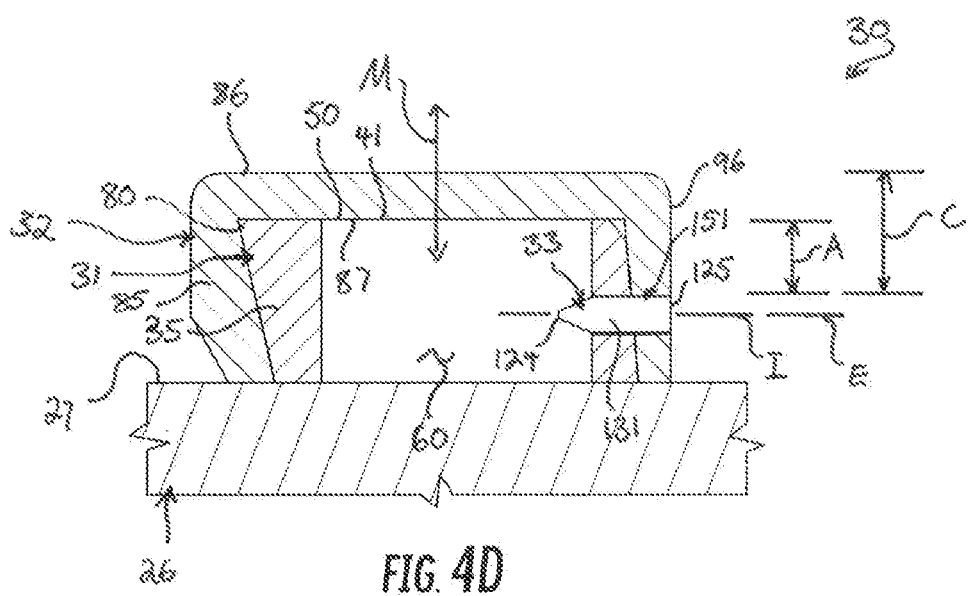

As seen in FIG. 4D, the wear plate assembly 30 is in a locked configuration. The wear plate 32 is applied to the base 31, and the key 33 is secured within the keyway 151. The key 33 is disposed below the lower surface 87 of the wear plate 32, below the upper surface 86 of the wear plate 32 by the distance C, and below the top surface 50 of the base 31 by the distance A. In this position, the key 33 is held in the bottom half of the base 31 and the bottom half of the wear plate 32. In other words, the key 33 is below a horizontal plane bisecting the base 31. The front end 124 of the key 33 is within the interior 60 of the base 31, and the rear end 125 is flush with the outer surface 96 of the wear plate 32, so that the entirety of the key 33 is within the wear plate assembly 30 and interlocked between the base 31 and the wear plate 32. With the key 33 locked within the keyway 151, as shown and explained above with reference to FIG. 5B, the key 33 will not freely move laterally along the axis I of the keyway 151. Moreover, the wear plate 32 will not freely move with respect to the base 31. Relative lateral movement of the wear plate 32 along a direction parallel to the axis I of the keyway 151 is limited by the interaction between the sidewalls 35 and 85 of the base 31 and the wear plate, respectively. Relative lateral movement of the wear plate 32 in and out of the page is also limited by the interaction between the sidewalls 35 and 85 of the base 31 and the wear plate, respectively, as well as interaction between the first and second sides 130 and 131 of the key 33 and the ends 72, 73, 113, and 114 of the slots 70 and 111 in the sidewalls 35 and 85. Relative vertical movement of the wear plate 32 transverse to axis I along the direction indicated by the double-arrowed line M is limited by the outer surface 27 of the bucket 26 in one direction, and by the lip 80 on the base 80 and the key 33 in the keyway 151.

In the assembled, locked configuration shown in FIG. 4D, the wear plate assembly 30 is ready for use. As the wear plate assembly 30 is used and scraped or beaten against rugged debris, the upper surface 86 of the wear plate 32 is abraded and worn away. When the upper surface 86 is partially or completely worn through, the wear plate 32 should be removed and replaced. Because the wear plate 32 encapsulates the base 31, the base 31, the key 33, and the keyway 151 are not abraded or damaged, and the base 31 and the key 33 can be reused. In cases of extreme wear and failure to replace the wear plate 32, the upper surface 86 may wear completely through and the top 41 of the base 31 may begin to wear down. Such wear still spares the base 31 from damage and preserves it for future use, because the keyway 151, located in the bottom half of the base 31, is away from and protected from extreme wear such that the structure of the keyway 151 is preserved, the key 33 can be removed, and the base 31 can be reused.

Disassembly of the wear plate assembly 30 according to the principle of the invention will now be discussed with reference to FIGS. 6A-6D, which are section views showing removal of the wear plate 32. For purposes of clarity and ease in identifying reference characters, FIGS. 6A-6D show the wear plate 32 without significant wear. It should be understood that, while the wear plate 32 can be replaced at any time and with any amount of wear at the operator's discretion, the wear plate 32 will generally be replaced when the top 83 of the wear plate 32 has been significantly worn, the upper surface 86 is close to the lower surface 87, and the sidewall 85 remains free of wear.

Figure 6A:
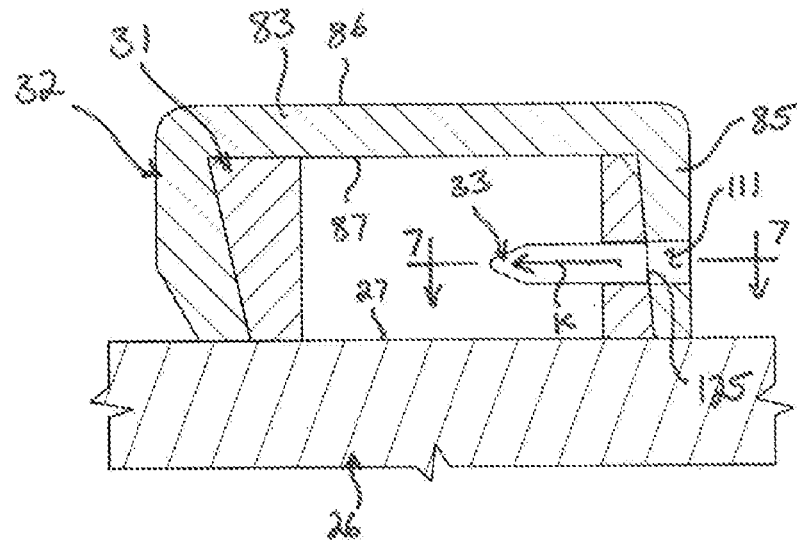
FIGS. 6A-6D are section views taken along the line 4-4 of FIG. 2A showing a sequence of steps of the wear plate being removed from the base secured to the surface of the heavy equipment machine.

To free the wear plate 32 from the base 31, the key 33 is advanced along line K as shown in FIG. 6A or other tool by pressing against the rear end 125 with a crowbar and applying forward force. With reference now to FIG. 7A, which shows an enlarged view of the keyway 151, the key 33 advances along line K so that the front end 124 moves further into the interior 60 of the base 31 and the rear end 125 moves from its location flush with the outer surface 96 of the wear plate 32 and into the keyway 151. As the projection 144 moves out of the notch 153, the key compresses 33 compresses at the compressible middle 132, which deforms from the compressed state with width F' to the super-compressed state with width F", so that the key has the super-compressed width J". The key 33 continues to be advanced until the rear end 125 of the key 33 leaves the slot 111 portion of the keyway 151 and is within the slot 70 portion of the keyway 151, as shown in FIG. 7B. At this point, the key 33 is held within the keyway 151 only by the base 31, and the wear plate 32 can be removed from the base 31.

Figure 6B:
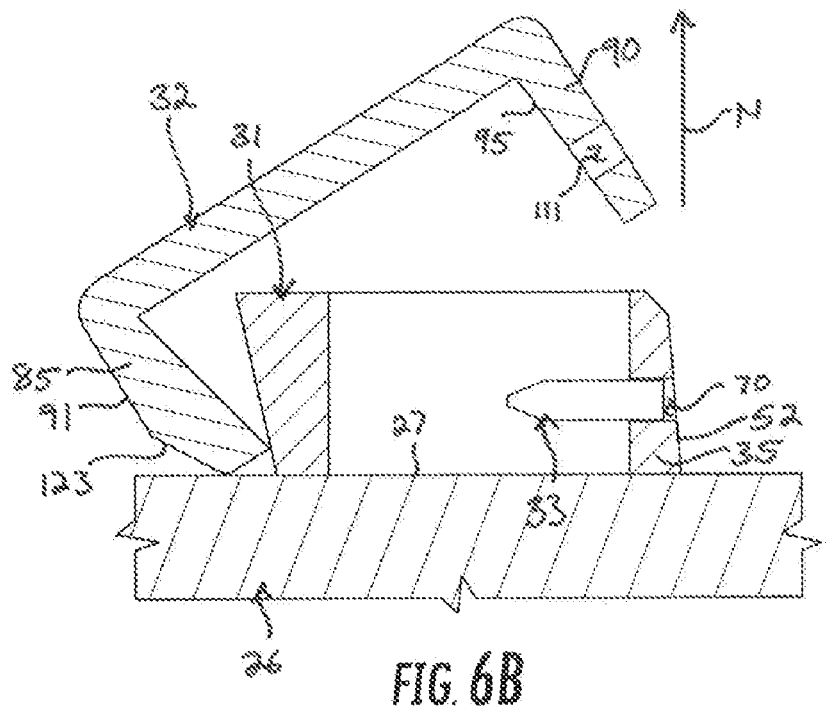

FIG. 6B shows the first step of removal of the wear plate 32. The key 33 is held within the slot 70 in the base 31 and extends into the interior 60. The front portion 90 of the wear plate 32 is lifted, as by hand, and raised upward along the direction generally indicated by line N. The bevel 123 in the sidewall 85 allows the wear plate 32 to tilt while proximate to the base 31, providing room as the front portion 90 is lifted. Grime and dirt that may have accumulated between the base 31 and the wear plate 32 does not obstruct this first movement because the outer surface 52 of the sidewall 35 of the base 31, and the inner surface 95 of the sidewall 85 of the wear plate 32, are oblique, preventing shear forces caused by cementation of dirt and grime from restricting removal.

Figure 6C:
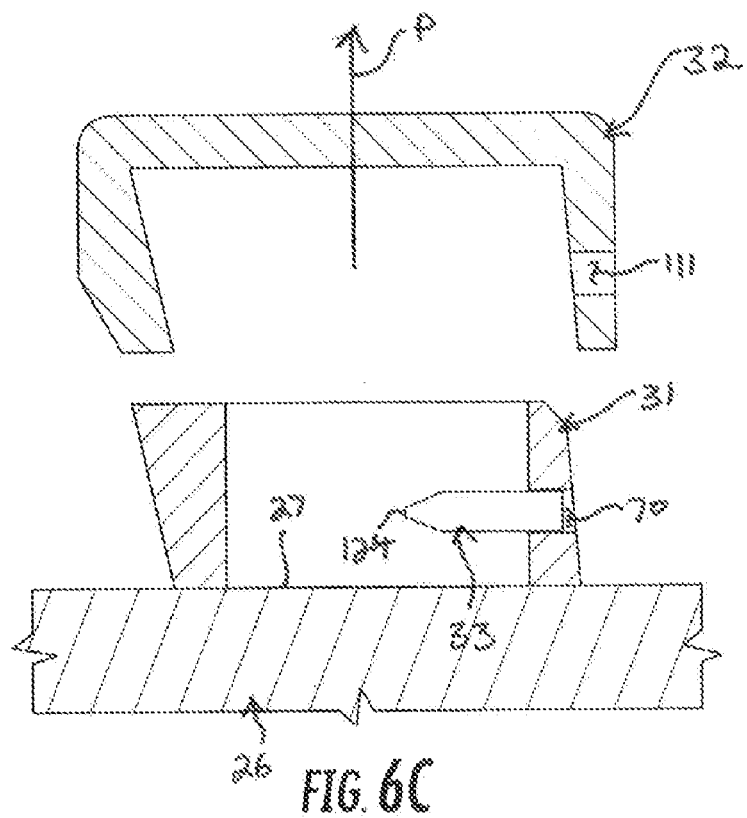
Figure 6D:
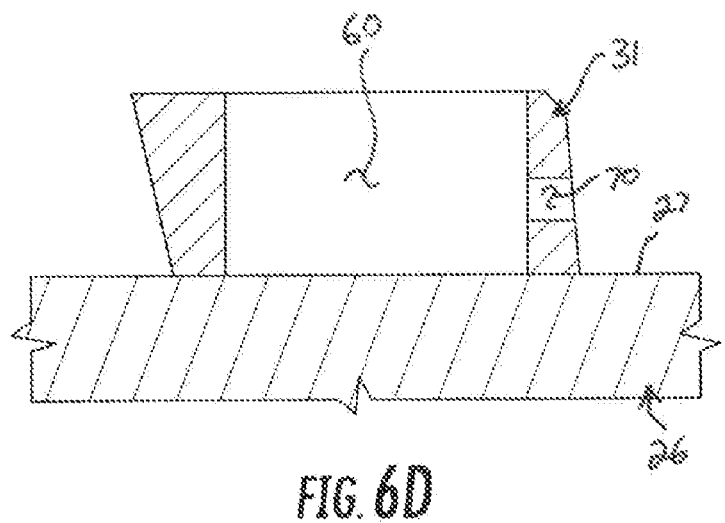

FIG. 6C illustrates the next step in removing the wear plate 32. With the front portion 90 of the wear plate 32 lifted free of the base 31, the wear plate 32 in its entirety is lifted, as by hand, upwardly away from the base 31 along the direction indicated by the line P. With the wear plate 32 removed in a free condition, the interior 60 of the base 31 is exposed, and the key 33 is available to be withdrawn from the slot 70. The key 33 is removed simply by grabbing the key 33, with fingers, pliers, or the like, and pulling the key 33 out of the slot 70. FIG. 6D shows the base 31, with the key 33 now removed, ready to receive a replacement wear plate 32 in accordance with the above teachings.

Figure 8A:
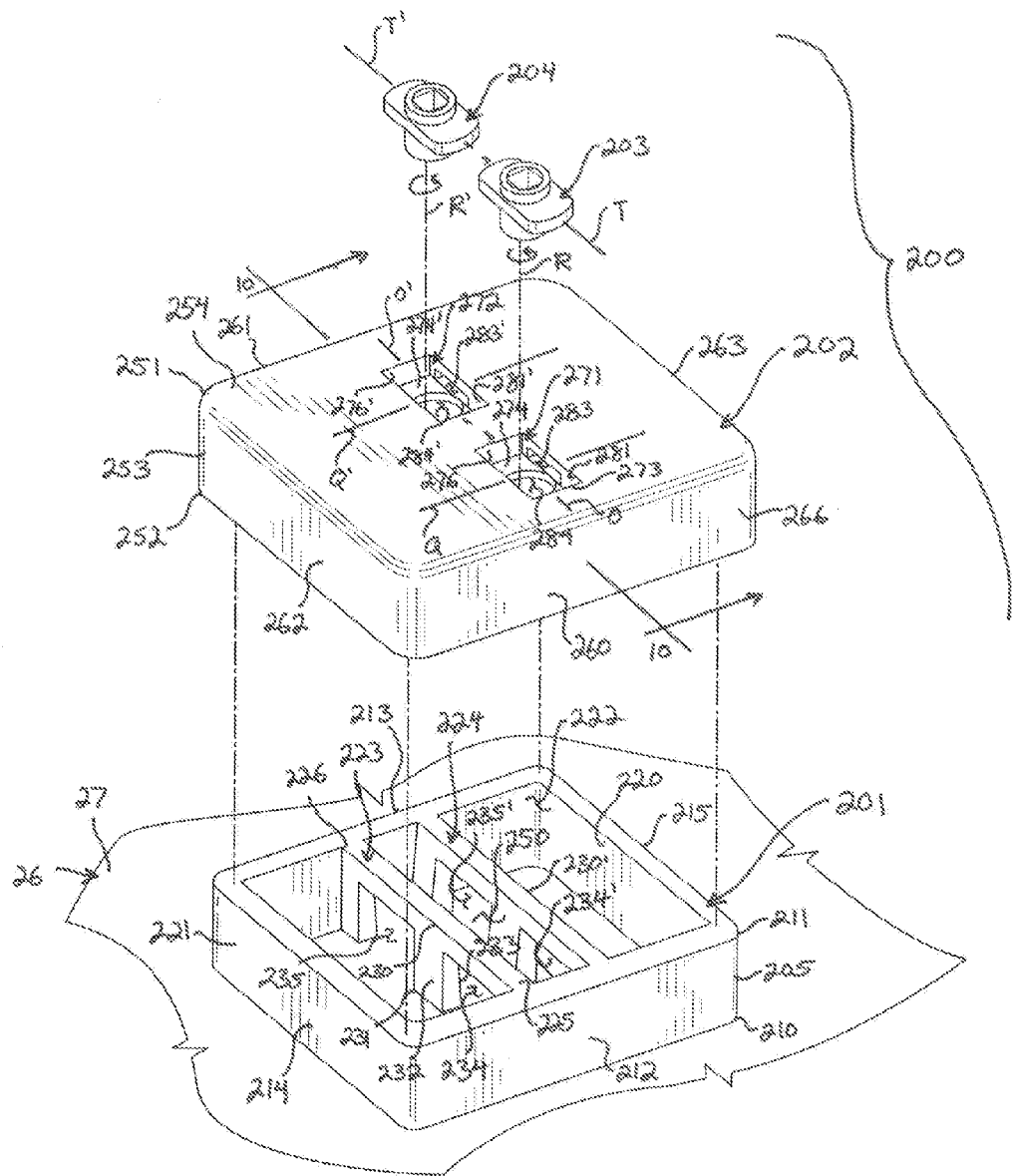
FIG. 8A is an exploded top perspective view of a base, a wear plate, and keys of an embodiment of the wear plate assembly, and the surface of the heavy equipment machine of FIG. 1.

FIG. 8A is an exploded view of a wear plate assembly 200 according to an embodiment of the principle of the invention. The wear plate assembly 200 is similar to the wear plate assembly 30 described above as the wear plate assembly 200 includes a base 201 mounted to the outer surface 27 of the bucket 26, a wear plate 202, and two keys 103 and 104. The base 201 is a bracket with an upstanding sidewall 205 extending from a bottom 210 to an opposed top 211. The sidewall is composed of four sides or portions, which are designated here for reference only as a front portion 212, a rear portion 213, a left portion 214, and a right portion 215. Each of the four portions 212, 213, 214, and 215 has a generally rectangular cross-section. The sidewall 205 has opposed inner and outer surfaces 220 and 221, and the outer surface 221 is slightly oblique. The inner surface 220 bounds an interior 222 within the base 201 between the outer surface 27 of the bucket 26 and the top 211.

Two braces 223 and 224 extend through the interior 222 of the base 201 between the front and rear portions 212 and 213. The braces 223 and 224 are identical in every respect other than location, and as such only the brace 223 will be described, with the understanding that the ensuing discussion applies equally to the brace 224 and that reference characters used to describe the various structural features of the brace 223 are applied to the brace 224 but designated with a prime ("'") so as to distinguish those structural features from the features of the brace 223. The brace 223 is an inner wall with a front end 225 mounted to the inner surface 220 of the front portion 212 of the sidewall 205, a rear end 226 mounted to the inner surface 220 of the rear portion 213 of the sidewall 205, a top 230 at the top 211 of the base 201, and a bottom 231 at the bottom 210 of the base 201. The brace 223 has an outer surface 232 directed toward the left portion 214, and an opposed inner surface 233 directed toward the right portion 215. The outer and inner surfaces 232 and 233 incline slightly obliquely toward each other from the bottom 231 to the top 230. The brace 223 is located between the left portion 214 of the sidewall 205 and a location generally intermediate between the left and right portions 214 and 215. The bottom 231 of the brace 223 is notched with two cuts extending into and completely through the brace 223 between the outer and inner surfaces 232 and 233. When the base 31 is mounted to the outer surface 27 of the bucket 26, as shown in FIG. 8A, the cuts cooperate with the outer surface to define two voids 234 and 235 in the brace 223 proximate to the front and rear portions 212 and 213 of the sidewall 205, respectively. With reference now to both FIG. 8A and to FIG. 8B, which more easily shows the structure of the brace 223, the void 234 is bound by the outer surface 27 of the bucket 26, a lower surface 240 of the brace 223, an inner surface 241 at the front end 225 of the brace, and an inner surface 242 between the front end 225 of the brace and a middle 243 of the brace. Similarly, the void 235 is bound by the outer surface 27 of the bucket 26, a lower surface 243 of the brace 223, an inner surface 244 at the rear end 226 of the brace, and an inner surface 245 between the rear end 226 of the brace and a middle 243 of the brace. As mentioned above, the brace 224 is identical in structure to the brace 223, and as such, includes opposed front and rear ends 225' and 226', a top 230', an opposed bottom 231', opposed outer and inner surfaces 232' and 233', voids 234', and 235', lower surfaces 240' and 243', and inner surfaces 241', 242', 244', and 245'. The brace 224 is located between the right portion 215 of the sidewall 205 and a location generally intermediate between the left and right portions 214 and 215.

A portion of the interior 222 between the braces 223 and 224 is a receiving area 250. The receiving area 250 is bound laterally by the inner surfaces 233 and 233' of the braces 223 and 224, respectively, and by the inner surface 220 of the front and rear portions 212 and 213 of the sidewall 205, and vertically by the outer surface 27 of the bucket 26 and the top 21 of the base 201. The receiving area is a seat into which a portion of the wear plate 202 is positioned when the wear plate 202 is applied to the base 201. On either side of the receiving area 250, the voids 234 and 234' are opposed and aligned, and the voids 235 and 235' are opposed and aligned.

The base 201 is constructed of a material having characteristics of ruggedness, durability, rigidity, hardness, such as iron or steel, and is preferably integrally formed or cast. The base 201 is permanently secured to the outer surface 27 of the bucket 26 along the bottom 210 of the base 201, such as by welding or other similar rugged fastening, so as to provide a rugged, stable, and strong support for the wear plate 202.

Figure 8B:
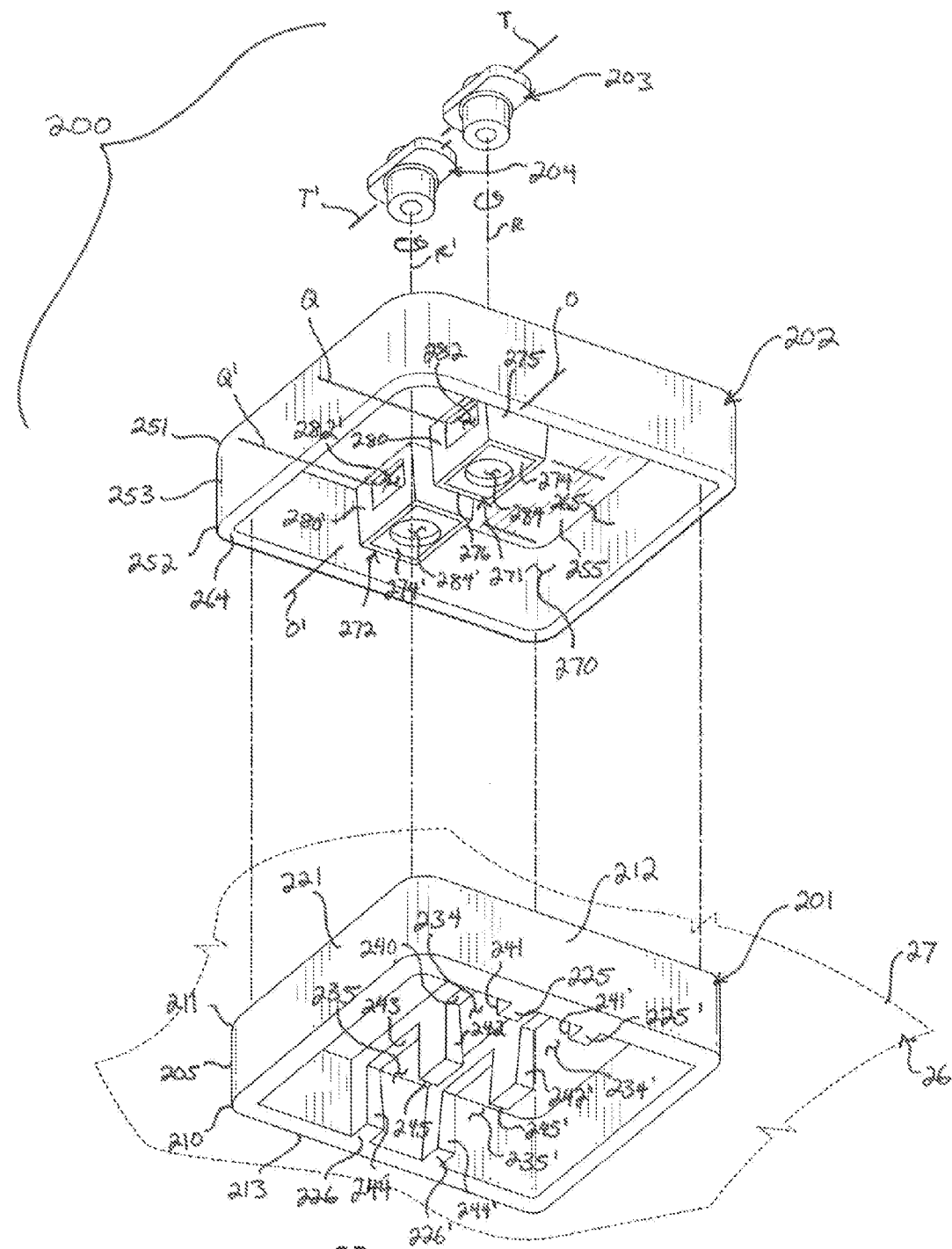
FIG. 8B is an exploded bottom perspective view of the base, the wear plate, and the keys of the wear plate assembly, and the surface of the heavy equipment machine of FIG. 8A.

The wear plate 202 is a protective piece that protects the base 201 and the outer surface 27 of the bucket 26 from abrasion and wear. With reference again to FIG. 8A in which the wear plate 202 is illustrated from above, the wear plate 202 has a top 251, an opposed bottom 252, and a sidewall 253 depending from the top 251 to the opposed bottom 252 around a perimeter of the wear plate 202. The top 251 has an upper surface 254 and an opposed lower, or inner, surface 255, as seen in FIG. 8B. The upper and inner surfaces 254 and 255 are generally flat and parallel with respect to each other. The sidewall 253 is composed of four sides or portions which are designated here for reference only as a front portion 260, a rear portion 261, a left portion 262, and a right portion 263. Each of the four portions 260, 261, 262, and 263 has a generally rectangular cross-section, extends perpendicularly to the neighboring portions, and depends perpendicularly from the top 251. The sidewall 253 has a bottom surface 24, as clearly shown in FIG. 8B, and opposed inner and outer surfaces 265 and 266. Inner surface 265 is oblique. The inner surface 265 of the sidewall 253 and the inner surface 255 of the top 251 meet at right angles. The inner surface 265 of the sidewall 255 bounds an interior 270 within wear plate 202 between the inner surface 255 of the top 251 and the bottom surface 264 of the sidewall 253.

The top 251 is formed with two discontinuous, spaced-apart holds 271 and 272 depending downward into the interior 270 from openings in the upper surface 254. The holds 271 and 272 are identical in every respect other than location, and as such only the hold 270 will be described, with the understanding that the ensuing discussion applies equally to the hold 272 and that reference characters used to describe the various structural features of the hold 271 are applied to the hold 272 but designated with a prime ("'") so as to distinguish those structural features from the features of the hold 271. With reference now to both FIG. 8A and FIG. 8B, the hold 271 is a cradle for receiving and holding the key 271 which depends from a top 273 located at the top 251 of the wear plate 202 to a recessed, elongate seat 274 extending into the interior 270 of the wear plate 202. The hold 271 has a front 275 and an opposed rear 276, two opposed sides 280 and 281, and a longitudinal axis extending from front 275 to the rear 276 between the opposed sides 280 and 281. The hold 271 has a sidewall 282 depending from the top 273 and supporting the seat 274 which is formed with two opposed slots 282 and 283 in the sides 280 and 281, respectively. The slots 282 and 283 are located proximate to the seat 274 across the hold 271 from each other in opposite, offset positions on an axis Q along respective sides 280 and 281. The slot 282 is formed in the side 280 proximate to the front 275 of the hold 271, as seen in FIG. 8B, while the slot 283 is formed in the side 281 proximate to the rear 276 of the hold 271, as seen in FIG. 8A. The seat 274 is formed with a cylindrical bore or hole 284, extending completely through the seat 274 at the geometric center of the seat 274 equidistant between the front 275 and rear 276 and the opposed sides 280 and 281, for receiving the key 203 for rotation. An axis of symmetry and rotation extends through the hole 284 and is identified in FIGS. 8A and 8B with the reference character R. As mentioned above, the hold 272 is identical in structure to the hold 271, and as such includes a top 273', a seat 274', a front 275' and opposed rear 276', opposed sides 280' and 281', slots 282' and 283', and a hole 284' with an axis R'. The hold 272 is a cradle for receiving the key 204 for rotation.

The wear plate 202 is constructed of a material having characteristics of ruggedness, durability, rigidity, hardness, such as iron or steel, and is preferably integrally formed or cast. The top 251 is roughly six inches long on each side and the base is roughly two inches high between the top 251 and the bottom 252.

Figure 9A:
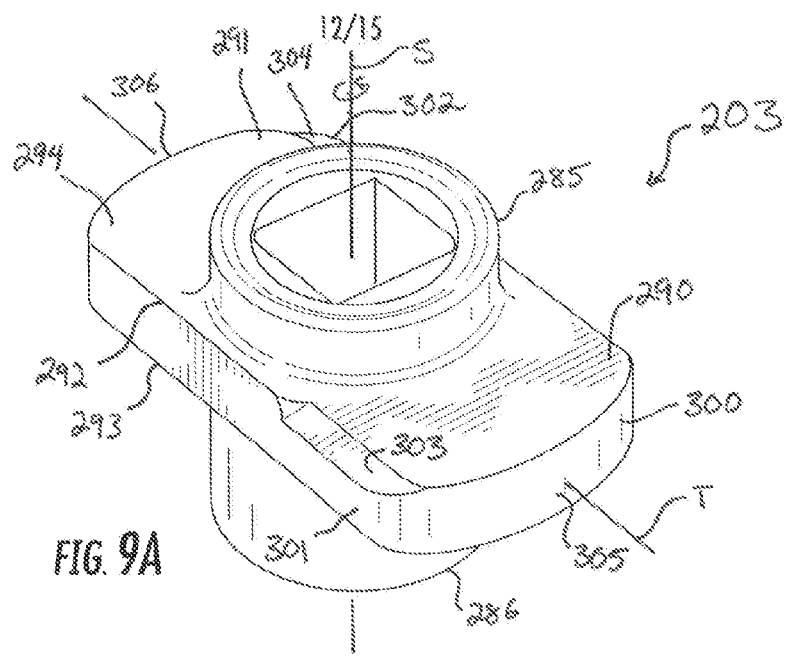
FIGS. 9A, 9B, and 9C are, respectively, front perspective, side elevation, and front elevation views of one of the keys of FIG. 8A.
Figure 9B:
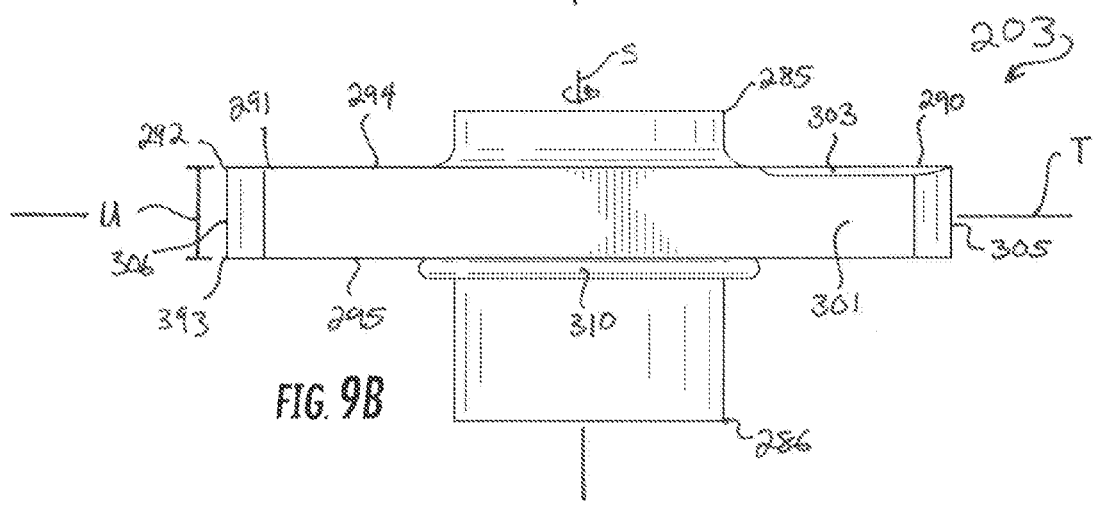
Figure 9C:
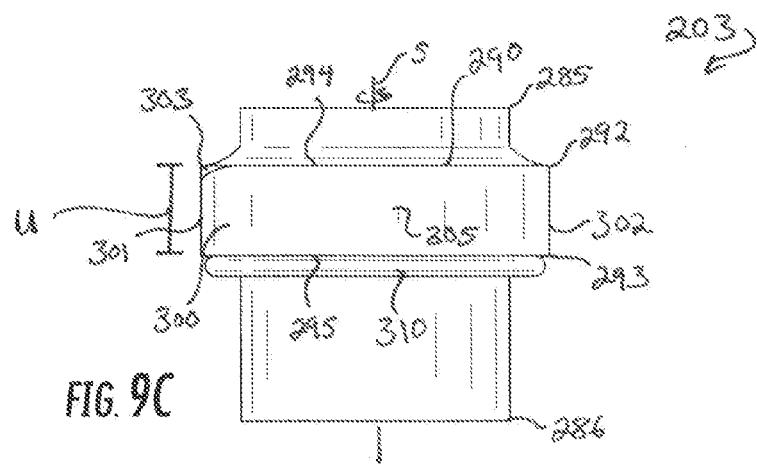

Attention is now directed to the keys 203 and 204, which are identical in every respect. FIGS. 9A, 9B, and 9C illustrate the key 203 in detail, and the description herein will refer only to the key 203 with the understanding that the discussion applies equally to the key 204 and that reference characters used to describe the various structural features of the key 203 are applied to the key 204 but designated with a prime ("'") so as to distinguish those structural features from the features of the key 203. The key 203 has a cylindrical body geometrically centered with respect to a rotational axis S indicated in FIG. 9A. The key 203 has a top 285 and bottom 286, and, between the top 285 and the bottom 286, opposed wings or projections 290 and 291 extending radially outward along axis T. The projections 290 and 291 share a top 292 and a bottom 293, an upper surface 294 extending across the top 292, and a lower surface 295 extending across the bottom 293. The upper and lower surfaces 294 and 295 are generally flat and parallel with respect to each other, and perpendicular with respect to the axis of rotation S of the key 203. A vertical sidewall 300 extends between the top 292 and bottom 293 around the projections 290 and 291 and includes two opposed contact faces 301 and 302. Contact faces 301 and 302 are formed on leading portions of the sidewall 300 when the key is rotated in a clockwise direction about axis S. Additionally, bevels 303 and 304 are formed in the sidewall 300 just above the contact faces 301 and 302, respectively. The bevel 303 extends along the top 292 of the projection 290 to an end 305 of the projection 290, and the bevel 304 extends along the top 292 of the projection 291 to an end 306 of the projection 291. As illustrated in FIGS. 9B and 9C, an annular gasket 310 is seated encircling the key 203 just below the lower surface 295 of the projections 290 and 291. A height U extends between the top 294 and the gasket 310. The gasket 310 is made of an elastomeric material, such as urethane or butyl rubber, with material characteristics of elasticity, compressibility, cyclic durability, and shape memory. The key 203 is constructed from a material or combination of materials having characteristics of ruggedness, durability, rigidity, and hardness, such as iron or steel, and are preferably integrally formed or cast.

As mentioned above, the key 204 is identical in structure to the key 203, and as such includes a top 285' and bottom 286', a rotational axis S', opposed projections 290' and 291' extending along axis T', a top 292' and bottom 293' of the projections 290' and 291', respectively, upper and lower surfaces 294' and 295', a sidewall 200', contact faces 301' and 302', bevels 304' and 305', opposed ends 305' and 306', a gasket 310', and a height U'. Likewise, the key 204 and the gasket 310' are constructed of similar materials as the key 203 and gasket 310, respectively.

Figure 10A:
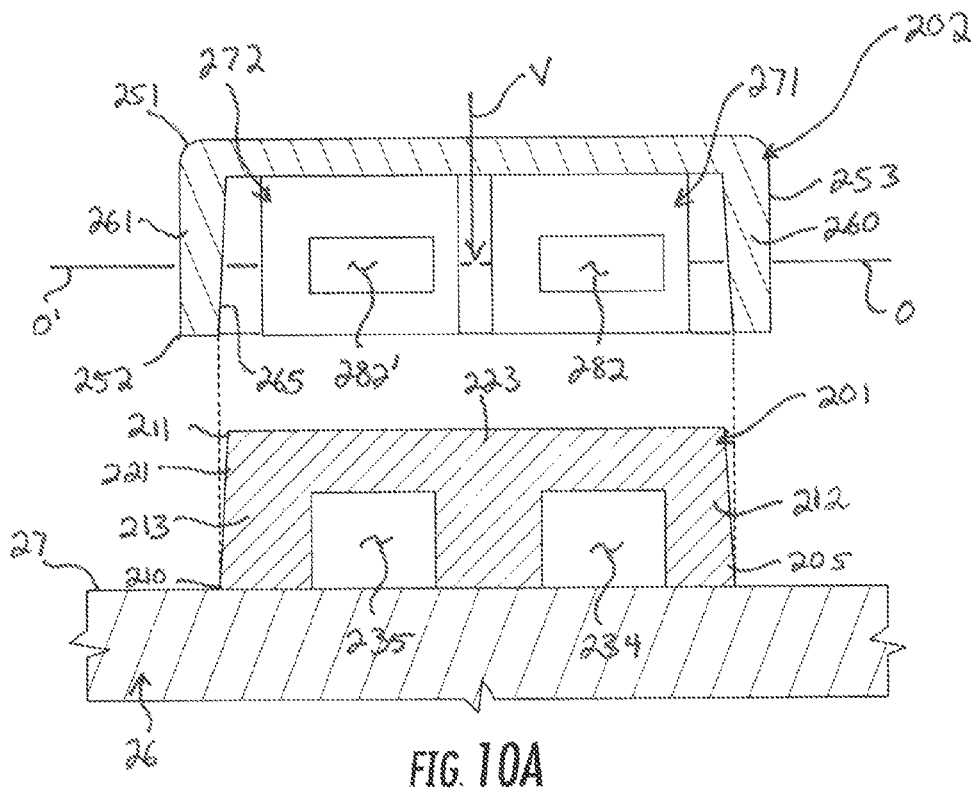
FIGS. 10A-10D are section views taken along the line 10-10 of FIG. 8A showing a sequence of steps of application of the wear plate to the base secured to the surface of the heavy equipment machine.

Assembly of the wear plate assembly 200 according to the principle of the invention will now be discussed with reference to FIGS. 10A-10D, which are section views taken along the line 10-10 in FIG. 8A. With reference first to FIG. 10A, the base is illustrated as it would appear secured to the outer surface 27 of the bucket 26 by a weld along the bottom 210 of the base 201. The wear plate 202 is initially in a free condition away from and above the base 201, ready to be applied to the base 201. The wear plate 202 is registered with the base 201, with the top 251 of the wear plate 202 directed away from the bucket 26 and the bottom 252 of the wear plate 202 directed downwardly toward the bucket 26, the front and rear portions 260 and 261 of the wear plate 202 above the front and rear portions 212 and 213 of the base 201, respectively, and, though not shown in FIG. 10A, the left and right portions 262 and 263 of the war plate 202 above the left and right portions 214 and 215 of the base 201, respectively. In this initial registered position, the inner surface 265 of the sidewall 253 of the wear plate 202 is aligned above the outer surface 221 of the base 205. Moreover, the holds 271 and 271 depending from the wear plate 202 are positioned directly above the receiving area 250 (not shown) formed between braces 223 and 224, the slots 282 and 282' are registered above the voids 234 and 235, respectively, and, though not distinguishable (and thus not referenced) in the view of FIG. 10A, the slots 283 and 283' are registered above the voids 234' and 235', respectively. From this free condition, the wear plate 202 is moved downward generally along the direction indicated by arrowed line V in FIG. 10A to move the wear plate 202 into the position illustrated in FIG. 10B.

Figure 10B:
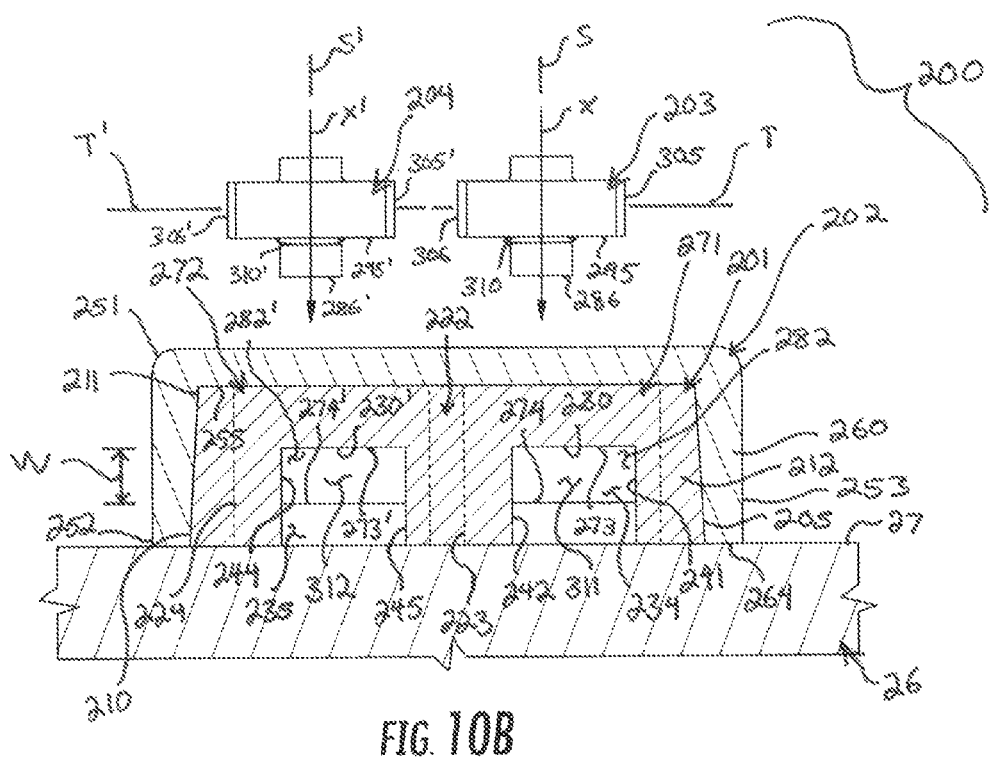

FIG. 10B illustrates the wear plate 202 applied to the base 201. In this applied condition, the top 211 of the base is in contact with the lower surface 255 at the top 251 of the wear plate 202, the inner surface 265 of the sidewall 253 of the wear plate 202 is received in juxtaposition against the outer surface 221 of the sidewall 205 of the base 201, and the hold 271 extends into the interior 222 of the base 201. The wear plate 202 is fully seated on the base 201 so that the bottom surface 264 of the wear plate 202 is in contact with the outer surface 27 of the bucket 26. In this applied condition, the wear plate 202 fully encapsulates the base 201, but for the openings in the top surface leading to the holds 271 and 272. The top 211 of the base 201 is separated from the environment by the vertical thickness of the top 251 of the wear plate 202, and the sidewall 205 of the base 201 is separated from the environment by the lateral thickness of the sidewall 253 of the wear plate 202. Although the above description of the application of the wear plate 32 to the base 31 has been described with a series of steps, it should be understood that the wear plate 32 is applied in one single, fluid motion to the base 31 in approximately one second.

In the applied condition of the wear plate 202, the slot 282 is aligned with void 234, which extend parallel to each other, and together cooperatively register to form a major keyway 311 extending along axis Q (seen in FIG. 8A and extending in and out of the page in FIG. 10B) through the interior 222 of the base 201 and the interior 270 of the wear plate 202. Similarly, slot 282' is aligned with void 235, and together cooperatively register to form a major keyway 312 extending along axis Q' (seen in FIGS. 8A and 8B and extending in and out of the page in FIG. 10B) through the interior 222 of the base 201 and the interior 270 of the wear plate 202. The top 230 of the brace 223 and the top 273 of the hold 271 are flush, and the top 230' of the brace 224 and the top 273' of the hold 272 are flush. The keyway 311 is bound by the top 230 of the brace 223 and the top 273 of the hold 271, by the seat 274 of the hold 271, and by the inner surfaces 241, 242, 244, and 245. Likewise, the keyway 312 is bound by the top 230' of the brace 224 and the top 273' of the hold 272, by the seat 274' of the hold 272, and by the inner surfaces 241', 242', 244', and 245'. The keyways 311 and 312 both have a height W between the tops 230 and 230' and the seats 274 and 274', respectively, and are formed to receive the keys 203 and 204.

Figure 10C:
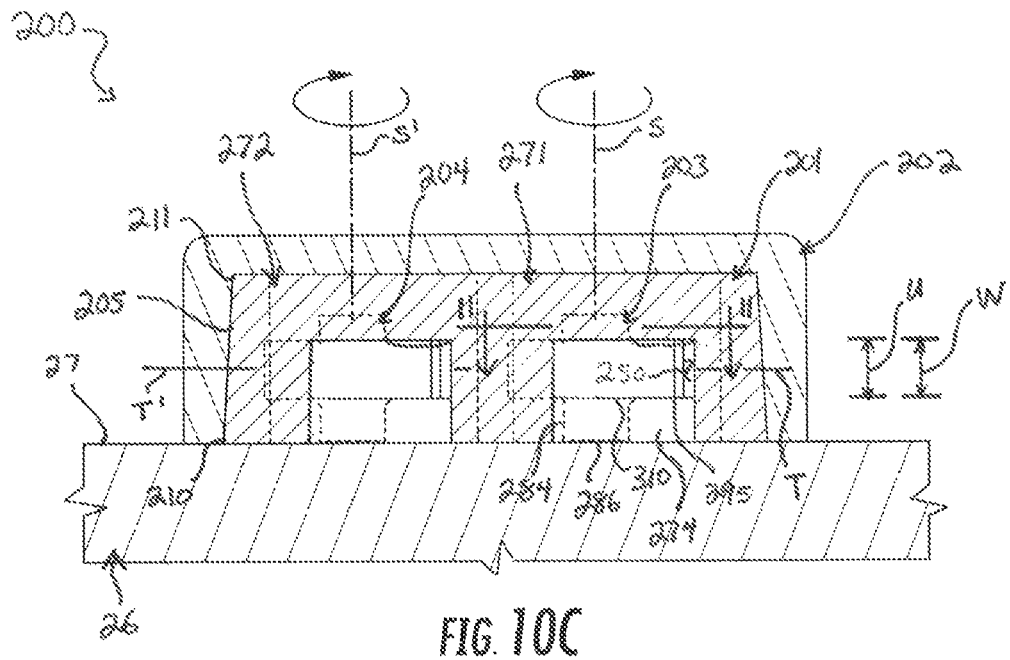
Figure 11:
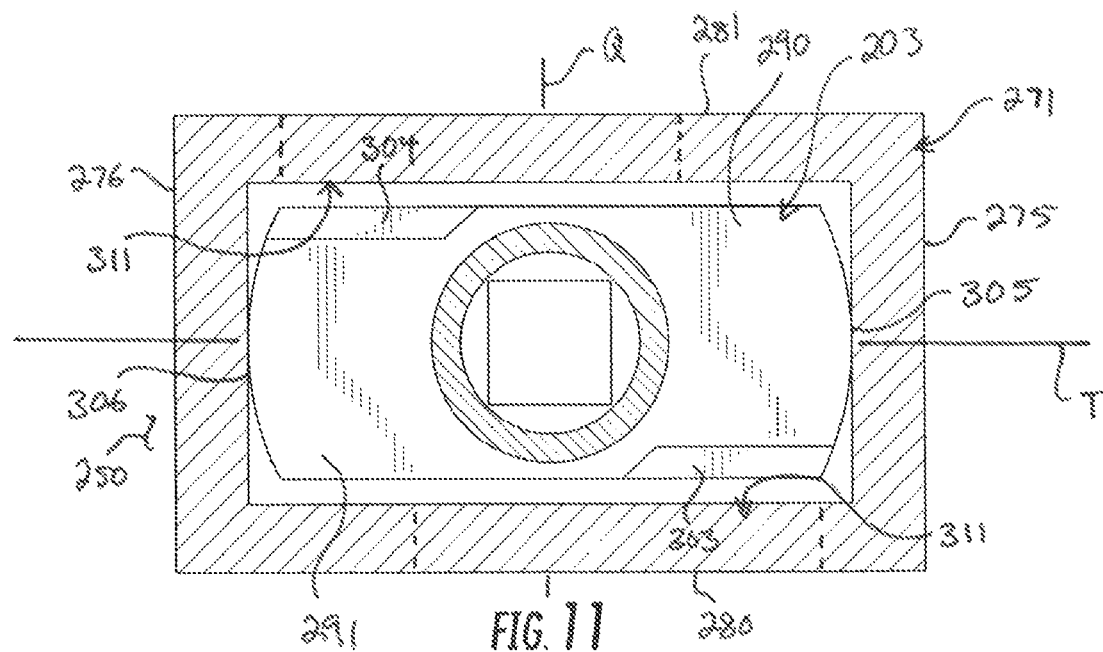
FIG. 11 is a section view taken along the line 11-11 of FIG. 10C illustrating the key in an unlocked condition.

In FIG. 10B, the keys 203 and 204 are outside of the keyways 311 and 312 and the wear plate 202 is in an unlocked configuration. From here forward in the discussion, description of the application and operation of the keys 203 and 204 will be made only with respect to the key 203, with the understanding that the discussion applies equally to the key 204 and corresponding structural elements, axes, and movements. The key 203 is registered with the hold 271, and the axis T of the key 203 is initially aligned with the axis O of the hold 271 (as referenced in FIG. 10A) so that the end 305 of the key 203 is proximate to the front portions 212 and 260 of the base 201 and wear plate 202, respectively, and the end 306 is away from the front portions 212 and 260. The key 203 is thus in a ready position for insertion into the hold 271. The key 203 is moved downward in the direction generally indicated by the arrowed line X toward the hold 271 until the bottom 286 of the key 203 is against the outer surface 27 of the bucket 26 and the key 203 is received in the seat 274, as shown in FIG. 10C and corresponding to an applied, unlocked configuration. The key 203 is in the receiving area 250 and the axis T extends along and within the receiving area 250. The key 203 is fit into the seat 274 and the bottom 286 extends into the hole 284, and the gasket 310 is compressed between the lower surface 295 of the projections 290 and 291 and the seat 274 just above the hole 284, biasing the key 203 upward away from and out of the seat 203. The gasket 310 is compressed so that the height U of the projections 290 and 291 and the gasket 310 is just slightly less than the height W of the keyway 311. As seen in FIG. 11, which is a detailed section view of the key 203 and the hold 271 of FIG. 10C, the key 203 fits snugly within the hold 271, with the end 305 proximate to the front 275 and the end 306 proximate to the rear 276. Projections 290 and 291 are entirely within the hold 271.

Figure 10D:
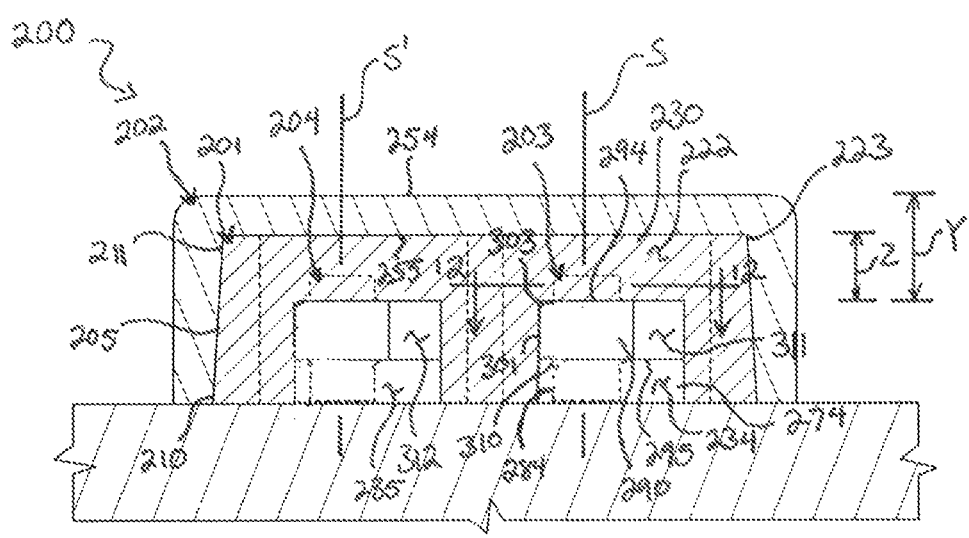

The key 203 is next moved from the applied, unlocked configuration shown in FIG. 10C and FIG. 11 to a locked configuration shown in FIG. 10D engaging and securing the wear plate 202 to the base 201 by rotating the key 203 about the rotational axis S clockwise one quarter of a revolution. Compression of the gasket 310 is maintained so that the projections 290 and 291 can be rotated into the keyway 311 which extends along axis Q through the hold 271 and the void 234, and the bevels 303 and 304 (not shown in FIG. 10D) guide the projections 290 and 291, respectively, into the keyway 311 under the tops 230 and 230' of the braces 223 and 224, respectively. The key 203 is rotated clockwise until the contact face 301 contacts the inner surface 242 of the brace 223, limiting further rotation of the key 203.

Figure 12:
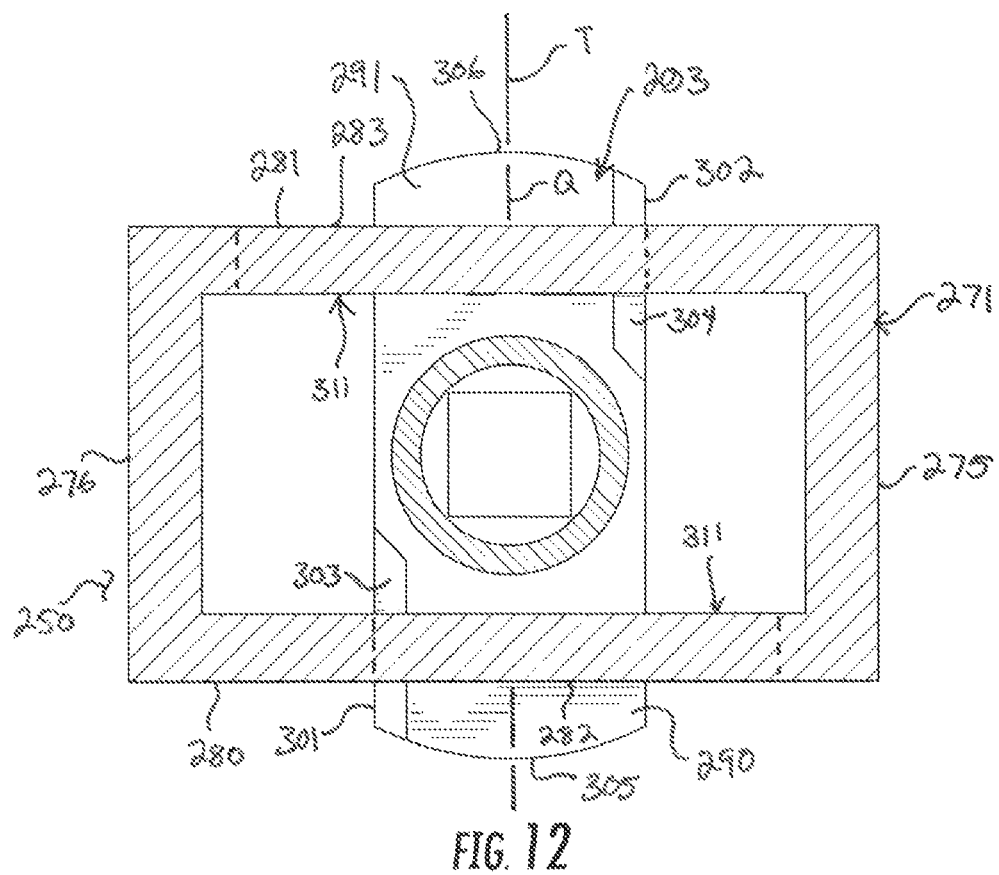
FIG. 12 is a section view taken along the line 12-12 of FIG. 10D illustrating the key in a locked condition.

As shown in FIG. 12, which is a detailed section view of the key 203 and the hold 271 of FIG. 10D, in the rotated and locked position of the key 203, the axis T of the key 203 extends parallel to the axis Q of the keyway 311, the projection 290 extends through slot 282, and the projection 291 extends through slot 283. Further, because the key 203 is rotated so that the projections 290 and 291 extend fully through keyway 311, FIG. 10D shows that the projection 290 extends into the void 234 as well. With continuing reference to FIG. 10D, in this rotated and locked configuration, the key interacts with several structures in interfering contact: the projection 290 is held between the seat 274 at the lower surface 295 of the projection 290 and the top 230 of the brace 223 at the upper surface 296 of the projection 290. Likewise, though not shown in FIG. 10D, the projection 291 is held between the seat 274' at the lower surface 295 of the projection 291 and the top 230' of the brace 224 at the upper surface 296 of the projection 291. The upward bias force from the compressed gasket 310 acting between the lower surface 295 and the seat 274 creates a press-fit engagement that holds the key 203 in place and prevents counter-clockwise rotation out of the locked configuration.

The key 203 constitutes a locking element between the base 201 and the wear plate 202. Vertical upward movement of the wear plate 202 from the base 201 is limited by the interaction of the key 203 between the braces 223 and 224 and the hold 271. Upward lifting of the wear plate 203 causes the seat 274 to lift as well, and in response, urges the key 203 to move upward in the seat 274, too. However, the key 203 abuts the tops 230 and 230' of the braces 223 and 224, which limit the key 203 from moving upward, because the braces 223 and 224 are formed with the base 201 which is secured to the bucket 26. Relative lateral movement of the wear plate 202 with respect to the base 201 is limited by the interaction between the sidewalls 205 and 253 of the base 201 and wear plate 202, respectively. Thus, with the key 203 in a rotated position, the wear plate 202 is locked to the base 201, and the wear plate assembly 200 is in a locked configuration.

With continuing reference to FIG. 10D, in the locked configuration, the wear plate 202 is applied to the base 201, and the key 203 is secured within the keyway 311. The key 203 is disposed below the lower surface 295 of the wear plate 202, below the upper surface 254 of the wear plate 202 by a distance Y, and below the top 211 of the base 201 by a distance Z. In this position, the key 203 is held in the bottom half of the base 201 and the bottom half of the wear plate 202. In other words, the key 203 is below a horizontal plane bisecting the base 201. The entirety of the key 203 is within the interior 222 of the base 201.

In the assembled, locked configuration shown in FIG. 10D, the wear plate assembly 200 is ready for use. As the wear plate assembly 200 is used and scraped or beaten against rugged debris, the upper surface 254 of the wear plate 202 is abraded and worn away. When the upper surface 254 is partially or completely worn through, the wear plate 202 should be removed and replaced. Because the wear plate 202 encapsulates the base 201, the base 201, the key 203, and the keyway 311 are not abraded or damaged, and the base 201 and the key 203 can be reused. In cases of extreme wear and failure to replace the wear plate 202, the upper surface may wear completely through and the top 211 of the base 201 may begin to wear down. Such wear still spares the base 201 from damage and preserves it for future use, because the keyway 311, located in the bottom-half of the base 201, is away from and protected from extreme wear such that the structure of the keyway 311 is preserved, the key 203 can be removed, and the base 201 cane be reused. One is reminded that, while the above discussion refers only to the key 203, it is to be understood that the discussion applies equally to the key 204, the hold 272, and other corresponding structure.

The wear plate assembly 200 is disassembled by reversing the steps described above, namely, rotating the key 203 counter-clockwise, lifting the keys 203 and 204 out of the seats 274 and 274', and removing the wear plate 202 from the base 201. Grime and dirt that may have accumulated between the base 201 and the wear plate 202 do not obstruct the removal of the wear plate 202 because the outer surface 225 of the sidewall 205 of the base 201 and the inner surface 265 of the wear plate 202 are both oblique, preventing shear forces caused by cementation of dirt and grime from restricting removal. Removal of the wear plate 202 places the base 201 in a condition ready for application of a new wear plate 202 according to the teachings above.

The present invention is described above with reference to a preferred embodiment. However, those skilled in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A wear plate assembly for protecting the surface of an earth-moving machine, the wear plate assembly comprising:
   a base including a bottom, an opposed top, an upper surface of the top, a sidewall extending from the bottom to the top along a perimeter edge of the base, opposed inner and outer surfaces of the sidewall, and an interior bound by the inner surface of the sidewall;
   a wear plate including a top, an opposed bottom, an outer sidewall extending from the top to the bottom, opposed inner and outer surfaces of the outer sidewall, and an interior bound by the inner surface of the outer sidewall and the top;
   the wear plate is moveable with respect to the base between a free condition and an applied condition;
   in the applied condition of the wear plate, the top of the wear plate is received against the top of the base, the inner surface of the outer sidewall of the wear plate is in contact with the outer surface of the sidewall of the base, and the wear plate and the base cooperate to form a keyway;
   a key is moveable with respect to the keyway between free and applied conditions;
   in the applied condition of the key, the key is moveable within the keyway between a first position corresponding to an unlocked configuration of the wear plate and a second position corresponding to a locked configuration of the wear plate; and
   the keyway is located below the top of the base, wherein
   the wear plate moves between the free and applied conditions along a first axis; and
   the keyway extends along a second axis transverse to the first axis.

2. The wear plate assembly of claim 1, wherein:
   in the unlocked configuration, the wear plate is free to move between the free and applied conditions; and
   in the locked configuration, the wear plate is secured against the base in the applied condition.

3. The wear plate assembly of claim 1, wherein the keyway is located at a position generally intermediate between the top and bottom of the base.

4. The wear plate assembly of claim 3, wherein the keyway is formed through the sidewalls of the base and the wear plate.

5. The wear plate assembly of claim 4, wherein the key moves between the first and second positions along a third axis extending transversely to the first axis.

6. The wear plate assembly of claim 3, wherein the key moves between the first and second positions by rotating the key about a fourth axis extending parallel to the first axis.

7. The wear plate assembly of claim 6, wherein:
   the base includes a brace extending through the interior of the base between opposed sides of the sidewall;
   the wear plate includes a hold depending from the top of the wear plate;
   in the applied condition of the wear plate, the hold extends into the interior of the base proximate to the brace; and
   the keyway is formed between the hold and the brace.

8. The wear plate assembly of claim 7, wherein:
   the hold includes an elongate seat recessed below the top of the wear plate which extends along a fifth axis, opposed walls extending from the top of the wear plate to the seat on opposed sides of the fifth axis, and slots formed in the opposed walls of the hold proximate to the seat;

a vertical bore extends through the seat;

the key comprises a cylindrical key body and opposed projections extending radially outward from the key body along a sixth axis;

in the first position of the key, the key is received within the bore, the sixth axis of the key is aligned with the fifth axis of the hold, and the opposed projections are within the receiving space; and in the second position of the key, the key is received within the bore, the sixth axis of the key is transverse to the fifth axis of the hold and parallel to the second axis, and the opposed projections extend through the slots in the walls of the hold in interfering contact between the base and the wear plate.

9. A wear plate assembly for protecting the surface of an earth-moving machine, the wear plate assembly comprising:

a base including a bottom, an opposed top, an upper surface of the top, a sidewall extending from the bottom to the top along a perimeter edge of the base, opposed inner and outer surfaces of the sidewall, an interior bound by the inner surface of the sidewall, and a brace extending through the interior of the base between opposed sides of the sidewall;

a wear plate including a top, an opposed bottom, an outer sidewall extending from the top to the bottom, opposed inner and outer surfaces of the outer sidewall, an interior bound by the inner surface of the outer sidewall and the top, and a hold having a seat, the hold extending from the top of the wear plate into the interior of the wear plate for receiving a key;

the wear plate is moveable between a free condition and an applied condition applied to the base;

in the applied condition of the wear plate, the top of the wear plate is received against the top of the base, the inner surface of the outer sidewall of the wear plate is in contact with the outer surface of the sidewall of the base, and the hold and the seat extend into the interior of the base proximate to the brace; and the key is applied to the seat in the hold for movement between a first position corresponding to an unlocked configuration of the wear plate and a second position corresponding to a locked configuration of the wear plate preventing relative movement of the base and the wear plate.

10. The wear plate assembly of claim 9, wherein the key is located below the top of the base.

11. The wear plate assembly of claim 9, wherein:

the brace is formed with a void through the brace in a first direction;

the hold is formed with a slot through the hold in a second direction parallel to the first direction;

in the second position of the wear plate, the void and slot cooperate to form a keyway; and in the second position of the key, the key extends through the keyway.

12. The wear plate assembly of claim 11, wherein the keyway is located at a position generally intermediate between the top and bottom of the base.

13. The wear plate assembly of claim 9, wherein:

the hold includes the seat recessed below the top of the wear plate which extends along a first axis, opposed walls extending from the top of the wear plate to the seat on opposed sides of the first axis, and slots formed in the opposed walls of the hold proximate to the seat;

a vertical bore extends through the seat;

the key comprises a cylindrical key body and opposed projections extending radially outward from the key body along a second axis;

in the first position of the key in the hold, the key is received within the bore, the second axis of the key is aligned with the first axis of the hold, and the opposed projections are within the receiving space; and in the second position of the key in the hold, the key is received within the bore, the second axis of the key is transverse to the first axis of the hold, and the opposed projections extend through the slots in the walls of the hold in interfering contact between the base and the wear plate.

14. The wear plate assembly of claim 13, further comprising means for biasing the key into a friction fit between the base and the wear plate, the means carried by one of the base, the wear plate, and the key.

15. The wear plate assembly of claim 14, wherein the means for biasing the key comprises an elastomeric gasket carried by the key.

* * * * *